US009421936B2

(12) United States Patent
Sugawara et al.

(10) Patent No.: US 9,421,936 B2
(45) Date of Patent: Aug. 23, 2016

(54) CASE MEMBER OF AIRBAG DEVICE, AIRBAG DEVICE, METHOD OF MANUFACTURING AIRBAG DEVICE, AND APPARATUS FOR MANUFACTURING AIRBAG DEVICE

(71) Applicant: NIHON PLAST CO., LTD., Shizuoka (JP)

(72) Inventors: Yoshiyuki Sugawara, Shizuoka (JP); Masaru Moritake, Eaton, OH (US); Hiromitsu Harada, Shizuoka (JP); Hideaki Saito, Shizuoka (JP); Masatoshi Ishigaki, Shizuoka (JP); Satoshi Nagaeda, Zhongshan (CN); Junichi Umehara, Shizuoka (JP); Hiroyuki Koizumi, Shizuoka (JP); Yuto Yamaguchi, Shizuoka (JP)

(73) Assignee: Nihon Plast Co., Ltd., Shizuoka (JP)

( * ) Notice: Subject to any disclaimer, the term of this patent is extended or adjusted under 35 U.S.C. 154(b) by 0 days.

(21) Appl. No.: 14/554,085

(22) Filed: Nov. 26, 2014

(65) Prior Publication Data

US 2015/0151705 A1    Jun. 4, 2015

(30) Foreign Application Priority Data

Nov. 29, 2013  (JP) ................................ 2013-247906
Jan. 14, 2014  (JP) ................................ 2014-004324

(51) Int. Cl.
*B60R 21/215*  (2011.01)
*B60R 21/217*  (2011.01)
(Continued)

(52) U.S. Cl.
CPC ........... *B60R 21/215* (2013.01); *B29C 65/0618* (2013.01); *B29C 65/7841* (2013.01); *B29C 66/1122* (2013.01); *B29C 66/301* (2013.01); *B29C 66/532* (2013.01); *B29C 66/542* (2013.01); *B29C 66/81431* (2013.01); *B29C 66/8322* (2013.01); *B60R 21/217* (2013.01); *B29C 66/71* (2013.01);
(Continued)

(58) Field of Classification Search
CPC combination set(s) only.
See application file for complete search history.

(56) References Cited

U.S. PATENT DOCUMENTS 3,778,085 A   12/1973  Lipkin
6,076,851 A   6/2000   Davis, Jr. et al.
(Continued)

FOREIGN PATENT DOCUMENTS

JP   2002-507172 A   3/2002
JP   2006-137375 A   6/2006
(Continued)

OTHER PUBLICATIONS

Search Report issued in GB1421269.0, dated May 29, 2015.

*Primary Examiner* — Nicole Verley
(74) *Attorney, Agent, or Firm* — Brundidge & Stanger, P.C.

(57) ABSTRACT

A light-weight and inexpensively-manufacturable case member of an airbag device is provided. The case member includes an inner portion integrally formed with an edge portion of an opening portion of a housing portion configured to internally hold a folded airbag and an inflator. A lid is fixed to a housing portion at a position where the lid at least partially covers the airbag housed in the housing portion. The opening portion is covered by an outer portion. Thus, a light-weight case member in which the inflator and the folded airbag are housed in the housing portion and covered by the lid can be manufactured inexpensively, without integration of a separately provided housing portion and lid or fixing the airbag or the inflator using an additional component.

11 Claims, 15 Drawing Sheets

(51) Int. Cl.
*B29C 65/78* (2006.01)
*B29C 65/00* (2006.01)
*B29C 65/06* (2006.01)
*B29L 31/30* (2006.01)

(52) U.S. Cl.
CPC ............ *B29L 2031/3038* (2013.01); *B60R 2021/21512* (2013.01); *B60R 2021/21537* (2013.01)

(56) References Cited

U.S. PATENT DOCUMENTS

| | | | |
|---|---|---|---|
| 6,158,763 A | 12/2000 | Dominique et al. | |
| 6,692,017 B2* | 2/2004 | Taoka | B60R 21/201 280/728.2 |
| 7,556,285 B1* | 7/2009 | Hayashi | B60R 21/2165 280/728.3 |
| 8,181,987 B2* | 5/2012 | Mazzocchi | B60R 21/215 280/728.2 |
| 8,657,327 B2* | 2/2014 | Kanno | B29C 65/06 180/90 |
| 8,764,052 B2* | 7/2014 | Funakura | B60R 21/20 280/728.3 |
| 9,156,428 B2* | 10/2015 | Edeline | B60K 37/00 |
| 2007/0040359 A1* | 2/2007 | Chen | B60R 21/2165 280/728.3 |
| 2009/0066068 A1* | 3/2009 | Kanno | B60R 21/205 280/741 |
| 2009/0315303 A1* | 12/2009 | Ettinger | B60R 21/215 280/728.2 |
| 2014/0375026 A1* | 12/2014 | Schupbach | B60R 21/215 280/728.3 |
| 2015/0258957 A1* | 9/2015 | Liu | B60R 21/215 280/728.2 |
| 2015/0321635 A1* | 11/2015 | Luckett | B60R 21/215 280/728.3 |

FOREIGN PATENT DOCUMENTS

| | | |
|---|---|---|
| JP | 2006-176061 A | 7/2006 |
| JP | 2006-327411 A | 12/2006 |

* cited by examiner

CASE MEMBER OF AIRBAG DEVICE, AIRBAG DEVICE, METHOD OF MANUFACTURING AIRBAG DEVICE, AND APPARATUS FOR MANUFACTURING AIRBAG DEVICE

CROSS REFERENCE TO RELATED APPLICATION

This application is entitled to the benefit of Japanese Patent Applications No. 2013-247906 filed on Nov. 29, 2013, and No. 2014-004324 filed on Jan. 14, 2014, the disclosures of which including the specifications, drawings and abstracts are incorporated herein by reference in their entireties.

TECHNICAL FIELD

The present invention relates to a case member of an airbag device configured to house a folded airbag and an inflator configured to supply gas to inflate and deploy this airbag, and also relates to an airbag device, a method of manufacturing the airbag device, and an apparatus for manufacturing the airbag device.

BACKGROUND ART

Airbag devices for automobiles are installed in a large number of vehicles as a means for protecting the drivers and passengers from the impacts of collisions, and such airbag devices include airbag devices used for the front-passenger seats. Some airbag devices for the front passenger seats are each configured to be covered by a panel so-called "seamless instrument panel," which is disposed in front of the front-passenger seat in a laterally long state, and which includes an airbag bulging door formed of a series of planar surfaces to prevent a to-be-torn line from being seen from the outside.

Among the front-seat passenger airbag devices disposed with the instrument panels of automobiles, there are known airbag devices each including a case member having a box shape and housing a folded airbag and an inflator configured to inject gas to inflate this airbag, and having an upper opening portion covered by a cover member integrally formed with the instrument panel, i.e., a seamlessly formed seamless design cover member. When the inflator blows an inflation gas into the airbag at the time of collision of an automobile, the airbag pushes up the instrument panel covering the bulging side of the airbag, and this pressure of the inflation tears the tear line provided to the instrument panel, thereby opening the door flap, i.e., the door portion.

Such a case member of an airbag device is formed by additionally attaching a door reinforcement portion to an inner portion including a square-tube shaped main body provided with a flange portion. In addition, after an outer portion to be integrated with an instrument panel is fixedly attached to this door reinforcement portion, the airbag and inflator held by a bottom plate member called a retainer, which is made of steel plate, for example, are inserted into the main body, and the case member is fixed to a fixing target portion such as a steering member using bolts or the like (e.g., see Patent Literature (hereinafter, referred to as "PTL") 1 and 2).

In addition, in order to obtain the texture harmonized with a surrounding interior material made of a polypropylene resin, for example, such a seamless instrument panel typically includes a surface skin member made of the same kind of resin disposed on the top surface side of the panel. In addition, a soft-resin made reinforcement member is combined to the undersurface side of the panel so that the surface skin member can form a predetermined door shape with inflation and expansion of the airbag.

PTL 3 discloses an airbag device of this kind, for example. The reinforcement member integrally reinforces a to-be-door portion and a circumferential portion of the to-be-door portion along the surface skin member over a predetermined width. Adding a predetermined pressing force to the to-be-door portion placed over the reinforcement member with relative vibration generates heat due to the sliding friction between the to-be-door portion and the reinforcement member. This heat causes the resin of one or both of the to-be-door portion and the reinforcement portion to melt, thereby making it possible to bond the to-be-door portion and the reinforcement member together.

The welding using the sliding frictional heat, so called vibration welding requires that the welding targets be superimposed one on top of the other while a pressing force is added to the abutting surfaces of the welding targets. For this reason, the airbag on the reinforcement member side during assembly needs to be incorporated after the welding process. Therefore, the housing portion integrally provided to the reinforcement member has an opening at the bottom and is formed in a box shape without lid, and the bottom plate member to which the airbag has been attached is mounted to the seamless instrument panel to which the to-be-door portion and the reinforcement member have been surely welded.

CITATION LIST

Patent Literature

PTL 1
Japanese Patent Application Laid-Open No. 2006-137375 (pages 4 to 8 and FIGS. 1 to 3 )
PTL 2
Japanese Patent Application Laid-Open No. 2006-176061 (pages 5 to 10 and FIG. 1 )
PTL 3
Japanese Unexamined Patent Application Publication (Translation of PCT Application) No. 2002-507172

SUMMARY OF INVENTION

Technical Problem

However, the airbag devices as disclosed in PTL 1 and PTL 2 require a configuration to reduce the weight of the device or a complex configuration to suppress a reaction force applied to an object by mitigating the impact using the airbag device before activation when the object collides with the portion of the instrument panel where the airbag device is installed.

In addition, the airbag device for the front-passenger seat can adopt a configuration that supports the airbag device by attaching the airbag device to the steering member of the instrument panel or a configuration that supports the airbag device by attaching the airbag device to the seamless instrument panel as in the case of PTL 3. In either configuration, however, a container having a bottom portion but no lid is mounted to close the end of the airbag device that is opposite to the inflating direction of the airbag.

More specifically, the invention disclosed in PTL 3 includes, as separate components, a door portion where the airbag pops out and the housing portion where the airbag is housed, and these portions are assembled together so as to embrace the door portion by the flange portions of the housing portion. For this reason, a connecting portion to connect the door portion and the housing portion is required, increasing a manufacturing step for this connecting process. In addition, the plate thickness increases for keeping the strength of the connecting portion, which leads to an increase in mass as well as in costs.

The present invention has been made in view of the points mentioned above and thus aims to provide a case member of an airbag device that is lighter in weight and easily manufacturable at low costs and also to provide an airbag device, a method of manufacturing the airbag, and an apparatus for manufacturing the airbag device.

Solution to Problem

The case member of an airbag device according to a first aspect of the present invention is a case member that is configured to house a folded airbag and an inflator configured to supply gas to inflate and deploy the airbag, the case member including: an inner portion including: a housing portion configured to internally hold the folded airbag and the inflator and provided with an opening portion from which the inflated airbag protrudes, and a lid formed integrally with an edge portion of the opening portion of the housing portion and configured to be fixed to the housing portion at a position where the lid at least partially covers the airbag housed in the housing portion; and an outer portion configured to cover the opening portion.

A case member of the airbag device according to a second aspect of the present invention is the case member according to the first aspect, in which: the lid extends from the edge portion of the opening portion of the housing portion and is bent toward the opening portion and fixed to the housing portion at a position where the lid at least partially covers the airbag housed in the housing portion; and the outer portion is fixedly attached to the inner portion while covering at least the position of the lid.

A case member of the airbag device according to a third aspect of the present invention is the case member according to the second aspect, in which: the housing portion includes a support receiving portion that extends to the edge portion of the opening portion; and the lid includes: a bent hinge portion that extends to the support receiving portion and that is deformable, a supporting portion configured to be connected to the support receiving portion via the bent hinge portion and to be at least partially placed over the support receiving portion by the bending of the lid toward the opening portion of the housing portion by the bent hinge portion, a to-be-inner-door portion configured to cover the opening portion and to spread under a deployment pressure generated when the airbag is inflated, and a hinge portion configured to connect the to-be-inner-door portion and the supporting portion in a deformable manner and to be positioned within the housing portion by the bending of the lid toward the opening portion of the housing portion at the bent hinge portion.

A case member of the airbag device according to a fourth aspect of the present invention is the case member according to the third aspect, in which: the supporting portion includes an insertion opening; and the support receiving portion includes a protruding portion configured to become substantially flush with the supporting portion when inserted into the insertion opening by the bending of the lid toward the opening portion of the housing portion at the bent hinge portion.

A case member of the airbag device according to a fifth aspect of the present invention is the case member according to the second aspect, in which: the lid includes: a hinge portion that extends to the edge portion of the opening portion of the housing portion and that is deformable and is configured to be positioned within the housing portion by the bending of the lid toward the opening portion of the housing portion at the edge portion of the opening portion, and a to-be-inner-door portion connected to the housing portion via the hinge portion and configured to cover the opening portion by the bending of the lid toward the opening portion of the housing portion at the edge portion of the opening portion and to spread under a deployment pressure when the airbag is inflated.

A case member of the airbag device according to a sixth aspect of the present invention is the case member according to the third aspect, in which: the housing portion includes a side surface portion inclined at an acute angle with respect to the lid; and the inner portion includes a turnable hinge portion configured to connect a portion of the inner portion that includes the lid and the side surface portion and a portion of the inner portion that does not include the side surface portion together in a turnable manner.

A case member of the airbag device according to a seventh aspect of the present invention is the case member according to the third aspect, in which: the outer portion is fixed to the inner portion by vibration welding; and the inner portion includes a jig insertion hole into which a jig that supports the to-be-inner-door portion is inserted when the outer portion is welded by vibration.

A case member of the airbag device according to an eighth aspect of the present invention is the case member according to the second aspect, in which: the inner portion includes a temporary fixing portion configured to temporarily fix the lid to the housing portion while the lid is bent toward the opening portion of the housing portion.

A case member of the airbag device according to a ninth aspect of the present invention is the case member according to the first aspect, in which the housing portion includes: a main body having a bottom portion and a peripheral wall portion, a flange portion provided to an edge portion of the opening portion, and a hinge formed integrally with the main body and configured to connect the main body and the lid at the edge portion of the opening portion, the lid is formed integrally with the main body via the hinge, opens the opening portion to allow the airbag to be housed from the opening portion, and integrally backs up the outer portion so as to block the opening portion by being turned around the hinge, and the outer portion includes: a to-be-door portion divided into portions by a to-be-torn portion that tears upon activation of the inflator and configured to cover the opening portion on an airbag bulging side of the housing portion and to form a door portion by inflation of the airbag, and an outline portion on an outer side of the to-be-door portion.

An airbag device according to a tenth aspect of the present invention includes the case member of the airbag device according to the first aspect; and an airbag configured to be connected to an inflator and to be housed in an inner portion of the case member.

A method of manufacturing the airbag device according to an eleventh aspect of the present invention is a method of manufacturing the airbag device according to the tenth aspect, the method including: housing the airbag in the housing portion from the opening portion and closing the opening portion using the lid; supporting the lid of the housing portion from below; and placing the outer portion on the housing portion and pressure bonding the outer portion onto the housing portion from above.

An apparatus for manufacturing the airbag device according to a twelfth aspect of the present invention is an apparatus for manufacturing the airbag device according to the tenth aspect, the apparatus including: a supporting unit configured to support the lid from below while the airbag is housed in the housing portion from the opening portion; and a bonding unit configured to pressure bond the outer portion and the lid together while the outer portion is placed on the lid.

A method of manufacturing an airbag device according to a thirteenth aspect of the present invention includes: housing an airbag in a housing portion from an opening portion and closing the opening portion using a lid; supporting the lid of the housing portion from below; and placing an outer portion on the housing portion and pressure bonding the outer portion onto the housing portion from above.

An apparatus for manufacturing an airbag device according to a fourteenth aspect of the present invention includes: a supporting unit configured to support a lid from below while an airbag is housed in a housing portion from an opening portion; and a bonding unit configured to pressure bond the outer portion and the lid together while the outer portion is placed on the lid.

Advantageous Effects of Invention

According to the present invention, it is possible to provide a case member of an airbag device that is lighter in weight, easily manufacturable, and capable of suppressing manufacturing costs and also to provide an airbag device, a method of manufacturing the airbag device, and an apparatus for manufacturing the airbag device.

DESCRIPTION OF EMBODIMENTS (First Embodiment)

Hereinafter, a description will be given of a first embodiment of a case member of an airbag apparatus of the present invention with reference to the drawings.

Figure 1:
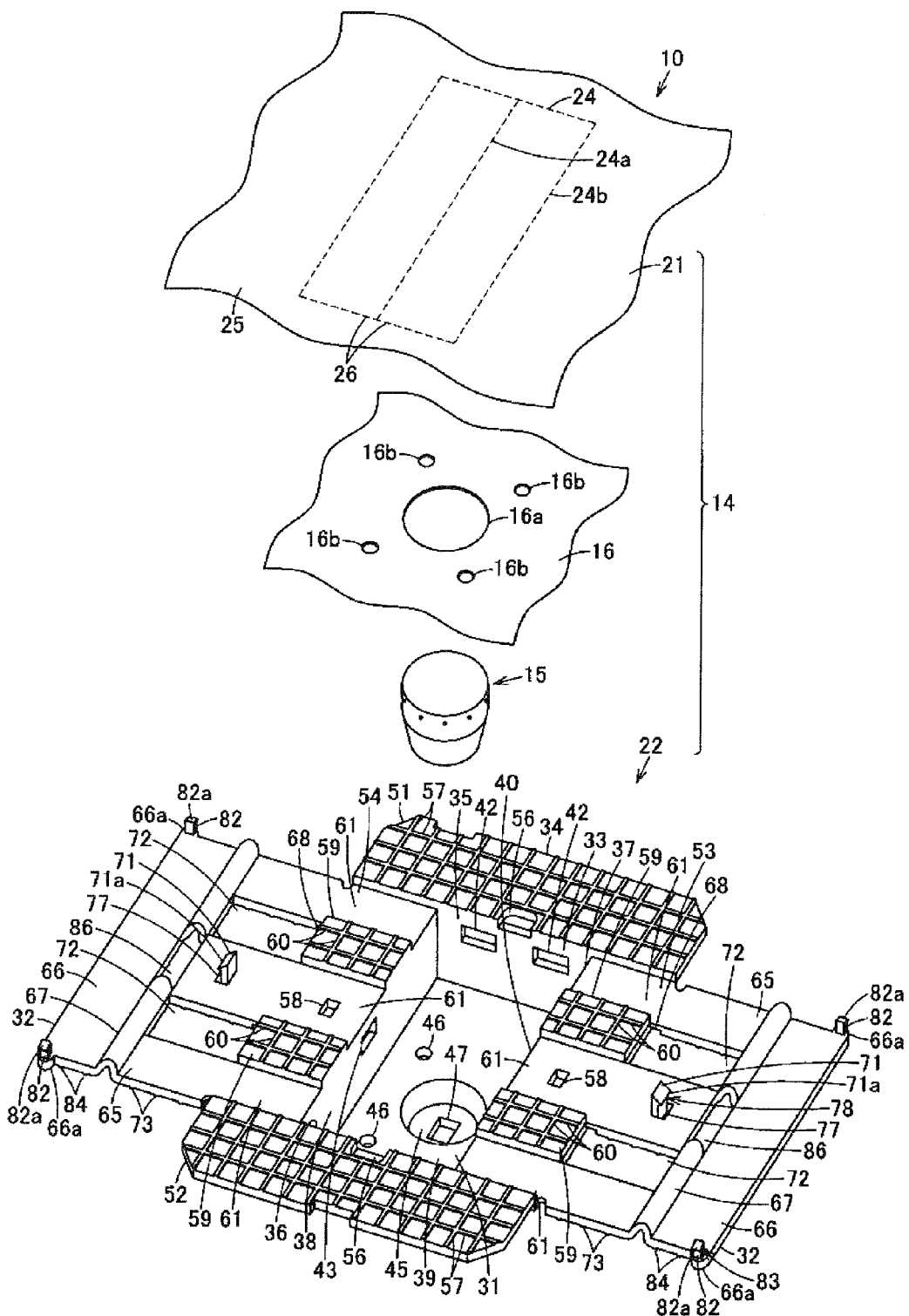
FIG. 1 is an exploded perspective view illustrating a first embodiment of a case member of an airbag device of the present invention.
Figure 2:
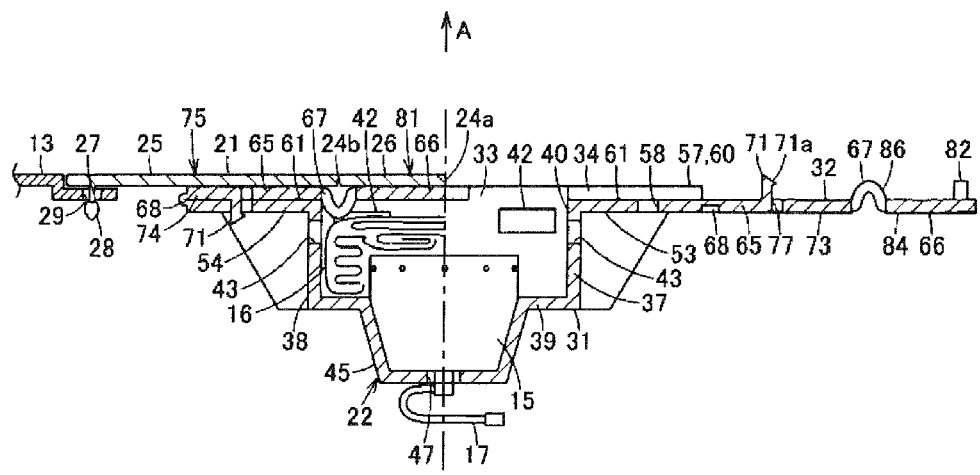
FIG. 2 is a cross-sectional view illustrating a molding state of the airbag device on the right side and an assembly state of the same on the left side.

In FIGS. 1 and 2, reference numeral 10 denotes an airbag device, and the airbag device 10 is front-passenger seat airbag device 10 included in instrument panel 13, which is an airbag installation portion of an automobile. Installment panel 13 is provided to the front portion of the vehicle interior substantially over the entire length in the vehicle width direction of the front portion. A windshield is located above instrumental panel 13. In addition, airbag device 10 is installed at a position located within instrument panel 13 and facing the passenger on the front-passenger seat. Airbag device 10 is a so called "shell packing airbag module" which includes case member 14, inflator 15 held in case member 14, and bag-shaped airbag 16 folded and housed in case member 14, and which is fixed to the vehicle body side via a bracket (not illustrated), for example. In the first embodiment, inflator 15 is formed in a flat disc-shape or cylindrical shape, for example, and provided with a connector portion (not illustrated) at a bottom portion corresponding to the lower end portion of inflator 15. Electric cable 17, which is called a harness, is connected to the connector portion of inflator 15 to electrically connect inflator 15 to the controller. Moreover, airbag 16 is formed in a bag-shape using a single or a plurality of foundation clothes. Airbag 16 includes insertion hole 16a into which inflator 15 is inserted at a center portion of airbag 16. Airbag 16 also includes a plurality of through holes 16b for fixing airbag 16 to casing member 14 around insertion hole 16a.

When an automobile provided with airbag device 10 collides, for example, airbag 16 bulges out by gas supplied from inflator 15 activated by the controller, and the bulging pressure tears a part of case member 14 and forms a bulging exit. Airbag 16 protrudes upward as a predetermined direction which is the direction of bulging exit and inflates and deploys forward of the passenger. Note that, a description will be given hereinafter while the bulging side of airbag 16, i.e., the predetermined direction which is the passenger side is referred to as "upper" (i.e., direction of arrow A illustrated in FIG. 2), "front side," or "top surface side," and the side opposite to the bulging side is referred to as "lower," "back surface side" or "undersurface side." In addition, a description will be given while the front-rear direction and lateral direction in a state where airbag device 10 is attached to an automobile are referred to as "front-rear direction" and "lateral direction," respectively. However, how airbag device 10 is attached is not limited to this configuration. For example, airbag device 10 can be attached in a state where the bulging side is in the upper rear direction or in the rearward direction.

Casing member 14 includes outer portion 21 serving as the surface skin and inner portion 22 fixedly attached to outer portion 21 by vibration welding or the like using a vibration welder, and is integrally configured with instrument panel 13.

Outer portion 21 is a component that is also called a surface skin panel, outer panel portion, panel member, or lid outer, for example. Outer portion 21 is a resin molded article formed by molding a predetermined synthetic resin such as polypropylene (PP), for example. Outer portion 21 is provided to the front portion of the vehicle interior in a substantially plate shape over substantially the entire vehicle length in the vehicle width direction while integrally covering the surface side of instrument panel 13 and exposed to the outside.

Tear line 24, which is a weak portion serving as a tear portion, is formed on the undersurface side of outer portion 21. Outer outline portion 25, which is a non-deploying portion, and a front-rear pair of to-be-outer-door portions 26 each being of a planar rectangular shape surrounded by outer outline portion 25 are formed as compartments. To-be-outer-door portions 26 cover the bulging side of airbag 16, which is normally folded and housed in the case member. Moreover, attachment portion 27 such as a clip base is formed on the undersurface side of outer portion 21 at a position near the outer edge portion. Clip 28, which is the attachment member attached to attachment portion 27, is press-fitted to attachment opening 29 of instrument panel 13, thereby fixing casing member 14 to instrument panel 13.

Tear line 24 is a portion that is also called a tear, tear groove, to-be-torn portion, to-be-cleaved portion, to-be-door line portion, or seam portion, and is a weak portion that has a V-shape in cross-section and that is more fragile than adjacent portions and is tearable and easily deformable. In this embodiment, tear line 24 has first tear line 24a subjected to an expansion pressure of airbag 16 extending to both sides of a center portion, and second tear line 24b forming an outline. Tear line 24 is formed in a shape substantially including "two adjacent rectangles" and includes a combination of first tear line 24a and second tear line 24b, which form a closed loop square frame shape. First tear line 24a extends laterally over a center portion and receives a deployment pressure of airbag 16, and second tear line 24b forms an outline. Tear line 24 may be formed when outer portion 21 is shaped, or may be engraved using a rotary blade after molding of outer portion 21, for example.

Meanwhile, inner portion 22 is a resin molded article integrally molded using a predetermined synthetic resin which is a material softer than a material forming outer portion 21 such as a thermoplastic elastomer (TPE) resin, for example. Inner portion 22 includes housing portion 31 and a front-rear pair of lids 32.

Housing portion 31 integrally includes: housing portion main body 33 of a square box shape, i.e., shape having a bottom (square tube shape having a bottom) for housing inflator 15 and airbag 16, and flange portion 34 serving as an expansion supporting portion provided while protruding outward from the upper edge portion of housing portion main body 33. Housing portion 31 is formed substantially symmetrically in the left and right direction and front and rear direction as a whole.

Housing portion main body 33 is to be called a container and includes: left side surface portion 35 and right side surface portion 36, which are long side surface portions serving as a pair of side surface portions facing each other in the left and right direction; front side surface portion 37 and rear side surface portion 38, which are short side surface portions serving as a pair of side surface portions facing each other in the front and rear direction; and bottom portion 39 of a rectangular shape that extends to the lower end portion of side surface portions 35, 36, 37, and 38. In addition, the upper end portions of side surface portions 35, 36, 37, and 38 form opening portion 40 of a rectangular shape where airbag 16 housed inside housing portion main body 33 in a state where the upper end portions are folded while facing to-be-outer door portions 26 of outer portion 21 protrudes at the time of inflation and deployment.

Side surface portions 35 and 36 each include jig insertion holes 42 located near the upper end portion, i.e., near opening portion 40 and apart from each other in the front and rear direction. Each jig insertion hole 42 is a square hole into which jig J1 (see FIG. 3) used in vibration welding between inner portion 22 and outer portion 21 is inserted from outside to inside of housing portion 31 (housing portion main body 33). Moreover, the upper end portions of side surface portions 35 and 36 protrude upward from the upper end portions of side surface portions 37 and 38 by the thickness of lid 32, for example.

Side surface portions 37 and 38 each include jig insertion hole 43 located near the upper end portion, i.e., opening portion 40. Jig insertion hole 43 is a square hole into which jig J2 (see FIG. 3) used in vibration welding between inner portion 22 and outer portion 21 is inserted from outside to inside of housing portion 31 (housing portion main body 33).

Figure 3:
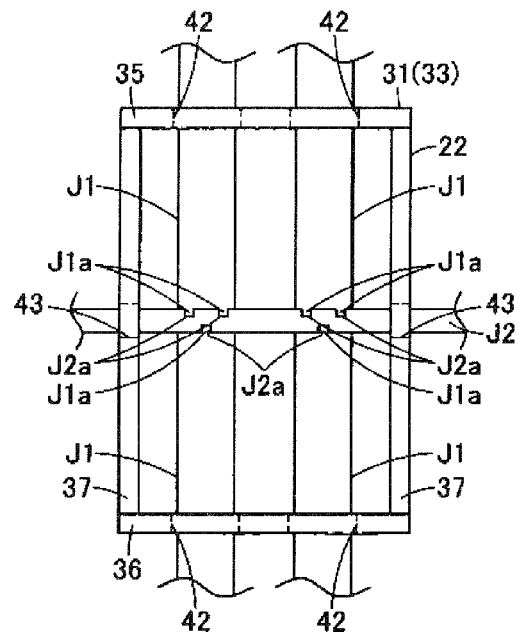
FIG. 3 is a plan view illustrating some manufacturing steps of the case member of the airbag device described above.

As illustrated in FIG. 3, each jig J1 is formed in a linear stick shape thicker than jig J2 using a metal member, for example, and is configured to be inserted inward of housing portion main body 33 (housing portion 31) from each jig insertion hole 42 of each of side surface portions 35 and 36 toward the center portion of the left and right direction. The leading ends of jigs J1 are provided with protruding portions J1a, respectively, to be locked with jig J2. In addition, jig J2 is formed in a linear stick shape using a metal member, for example, and is configured to be inserted through jig insertion hole 43 of each of side surface portions 37 and 38 along the front and rear direction. Jig J2 includes lock openings J2a into which protruding portions J1a of jigs J1 are inserted and locked. Inserting into and locking protruding portions J1a with lock openings J2a causes jig J1 to shift and to be locked in the longitudinal direction of jig J2 and thus positioned. Jigs J1 and J2 are disposed in a planar state at the lower portion of lid 32 at the position of opening portion 40 when combined in a grid shape after protruding portions J1a are inserted into and locked with lock openings J2a. Jigs J1 and J2 disposed in this manner are configured to support lid 32 from below against the pressure applied from above during vibration welding.

In addition, as illustrated in FIGS. 1 and 2, bottom portion 39 includes holding portion 45 of a bottomed cylindrical shape into which inflator 15 is press fitted and which is formed downward in a recessed manner at a center portion. Bottom portion 39 includes a plurality of openings around holding portion 45. The plurality of openings are circular through holes 46 into which retainer bolts of a retainer (not illustrated) for holding airbag 16 are inserted via through holes 16b of airbag 16. In addition, the bottom portion of holding portion 45 includes exposure opening 47 through which the connecter portion of inflator 15 is exposed.

Flange portion 34 includes: left flange 51 and right flange 52, which are long side flanges serving as a left and right (single) pair of flanges extending to the upper end portions of side surface portions 35 and 36, respectively; and front flange 53 and rear flange 54, which are support receiving portions (short side flanges) serving as a front and rear (another) pair of flanges extending to the upper end portions of side surfaces 37 and 38. In addition, flanges 51, 52, 53, and 54 integrally extend at the outer position of opening portion 40 to be formed in a square frame shape surrounding the periphery of opening portion 40.

Flanges 51 and 52 are each formed in a substantially plate shape extending in a planar shape along the direction orthogonal to the deployment direction of airbag 16. In addition, flanges 51 and 52 each include lock hole 56 used for temporarily locking lid 32 and provided at an edge position of opening portion 40 extending to side surface portions 35 and 36. Moreover, the upper surfaces of flanges 51 and 52, which face outer portion 21, are provided with welding ribs 57 for vibration welding and formed in a grid shape before outer portion 21 is welded (when molding inner portion 22).

Flanges 53 and 54 are each formed in a substantially plate shape extending in a planar shape along the direction orthogonal to the deployment direction of airbag 16. In addition, flanges 53 and 54 each include lock hole 58 used for temporarily locking lid 32 in the left and right direction of the center portion. Moreover, flanges 53 and 54 each include protruding portions 59, which are to be inserted into the lid 32 side and provided at both side positions of lock hole 58.

Each protruding portion 59 is formed in a rectangular shape having a longitudinal direction along the front and rear direction orthogonal to the left and right direction which is the longitudinal direction of flanges 53 and 54, for example. Protruding portions 59 are located more leftward and rightward than jig insertion hole 43. In addition, protruding portions 59 protrude upward by the amount of protrusion from side surfaces 37 and 38. More specifically, the upper surface portions of protruding portions 59 are substantially flush with flanges 51 and 52, and welding ribs 60 for vibration welding are formed on each of the upper surface portions in a grid shape before welding of outer portion 21 (during molding of inner portion 22). In each of flanges 53 and 54, recessed portion 61 of a square shape is formed between protruding portions 59 and at the side portions of protruding portions 59.

Each lid 32 is a component called a reinforcement flap, for example, and integrally includes: supporting portion 65; to-be-inner-door portion 66; and hinge portion 67 connecting supporting portion 65 and to-be-inner-door portion 66 in a deformable manner; and bent hinge portion 68 connecting supporting portion 65 and the upper end portion of flange 53 or 54 of housing portion 31 in a deformable manner. Each lid 32 extends to the outer side of housing portion 31 during molding of inner portion 22 and is configured to be reversed and bent (folded back) toward housing portion 31 at bent hinge portion 68 during assembly of case member 14.

Supporting portion 65 is a component also called a sub-flange portion, for example, and is a portion that does not deploy even when the inflation pressure of airbag 16 is applied. Supporting portion 65 faces the back surface of outer outline portion 25 of outer portion 21. Each supporting portion 65 is formed in a plate shape extending in a planar shape along the direction orthogonal to the deployment direction of airbag 16. In addition, each supporting portion 65 is provided with hook portion 71 at the center portion. Hook portion 71 is a locking protrusion to be inserted into lock hole 58 and temporarily locked. In addition, supporting portion 65 includes insertion openings 72 formed in a square shape on both sides of hook portion 71 along bent hinge portion 68. Protruding portions 59 of flanges 53 and 54 are fittingly inserted into insertion holes 72. Accordingly, supporting portion 65 is divided into the left and right portions so as to extend to the position of each recessed portion 61 for flange 53 and 54. Moreover, each supporting portion 65 includes welding ribs 73 for vibration welding in a grid shape before welding of outer portion 21 (during molding of inner portion 22). Each supporting portion 65 is configured to be directly placed over flange 53 or 54 in a state where lid 32 is reversed and bent toward housing portion 31 (opening portion 40) at the position of bent hinge portion 68. Moreover, supporting portions 65 form inner outline portion 74 together with flanges 51 and 52 when directly placed over flanges 53 and 54, and form outline portion 75 when inner outline portion 74 is fixedly attached to the back surface side of outer outline portion 25. Outline portion 75 surrounds outside of tear line 24 and does not deploy even when the inflation pressure of airbag 16 is applied.

Figure 4A:
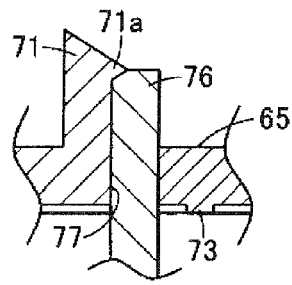
FIG. 4A is a cross-sectional view illustrating a part of a temporary fixing portion of an inner portion of the case member of the airbag device described above during manufacturing.
Figure 4B:
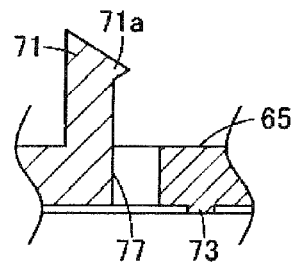
FIG. 4B is a cross-sectional view illustrating the temporary fixing portion illustrated in FIG. 4A after the manufacturing.

Hook portion 71 includes claw portion 71a at the leading end of hook portion 71. Hook portion 71 is formed when piece 76 disposed in the molding die (mold) for inner portion 22, for example, passes through supporting portion 65 and hits (see FIGS. 4A and 4B). Note that, the position of supporting portion 65 where piece 76 has passed through corresponds to opening 77 facing downward of claw portion 71a. Hook portion 71 and lock hole 58 form (first) temporary fixing portion 78 which temporarily fixes lid 32 to housing portion 31 in a state where lid 32 is reversed and bent toward opening portion 40 of housing portion 31.

Welding ribs 73 are formed on the back surface side of supporting portion 65 during molding of inner portion 22, i.e., on the side opposite to outer portion 21 (opposite to outer outline portion 25). In a state where lids 32 are reversed and bent toward opening portion 40 of housing portion 31 at the position of bent hinge portions 68, welding ribs 73 are substantially flush with welding ribs 57 of flanges 51 and 52 and welding ribs 60 of protruding portion 59 and fixedly attached to the rear surface side of outer outline portion 25 of outer portion 21.

To-be-inner-door portions 66 are each configured to cover airbag 16 housed in opening portion 40 and housing portion 31 in a state where lid 32 is reversed and bent toward opening portion 40 of housing portion 31 at the position of bent hinge portion 68. Each to-be-inner-door portion 66 has a plate shape extending in a planar shape along the direction orthogonal to the deployment direction of airbag 16, and in this embodiment, each to-be-inner-door portion 66 is formed to have an area that covers half of opening portion 40 in the front and rear direction. To-be-inner-door portion 66 is fixedly attached to the rear surface side of to-be-outer-door portion 26, thereby forming to-be-door portion 81. In addition, locking protruding portions 82 configured to be inserted and locked with lock holes 56 of flanges 51 and 52 are provided in a protruding manner in the thickness direction to the left and right side portions of the side of to-be-inner-door portion 66 which is opposite to hinge portion 67 (side opposite to housing portion 31). Locking protruding portions 82 are provided to protruding pieces 66a that protrude laterally from both sides of each to-be-inner-door portion 66, respectively, and claw portions 82a protrude laterally outward. Moreover, locking protruding portions 82 and lock holes 56 form temporary fixing portion 83 that temporarily fixes lid 32 to housing portion 31 in a state where lid 32 is reversed and bent toward opening portion 40 of housing portion 31. Moreover, each to-be-inner-door portion 66 includes welding ribs 84 for vibration welding formed in a grid shape before welding of outer portion 21 (during molding of inner portion 22). Each welding rib 84 is formed on the rear surface side of to-be-inner-door portion 66, i.e., the side opposite to outer portion 21 (side opposite to to-be-outer-door portion 26) during molding of inner portion 22. In a state where lid 32 is reversed and bent toward opening portion 40 of housing portion 31 at the position of bent hinge portion 68, welding ribs 84 are substantially flush with welding ribs 57 of flanges 51 and 52, welding ribs 60 of protruding portions 59, and welding ribs 73 of supporting portions 65 and fixedly attached to the back surface side of to-be-outer-door portion 26 of outer portion 21.

Hinge portion 67 curves in a U-shape and flexibly connects supporting portion 65 and to-be-inner-door portion 66 together, and bulges upward during molding of inner portion 22. When lid 32 is reversed and bent toward housing portion 31 (opening portion 40) at the position of bent hinge portion 68, hinge portion 67 is inserted into opening portion 40 and positioned near the upper end portions of side surface portions 37 and 38 in housing portion 31 (housing portion main body 33) and curves along a part (long side) of second tear line 24b positioned in the front and rear direction so as to bulge toward airbag 16 and is put over tear line 24 in the front and rear direction. Moreover, notch opening 86 is formed at the center portion of the longitudinal direction (left and right direction) of hinge portion 67. Notch opening 86 is set to have a longitudinal dimension corresponding to jig insertion hole 43 (substantially equal to jig insertion hole 43) and communicates with jig insertion hole 43 while facing jig insertion hole 43 in a state where lid 32 is folded back toward housing portion 31 (opening portion 40) at the position of bent hinge portion 68. In this manner, jig J2 is inserted through notch opening 86.

Bent hinge portion 68 is configured to cause molded lid 32 to fold back toward housing portion 31 before welding with outer portion 21 and flexibly connects each lid 32 (supporting portion 65) and flanges 53 and 54 together. In addition, bent hinge portion 68 is formed while the lower surface side of bent hinge portion 68 is recessed in a trench shape during the molding, for example, so that bent hinge portion 68 has a thickness smaller than the other portion of lid 32. Accordingly, the upper surface of bent hinge portion 68 is substantially flush with lid 32 (supporting portion 65) and flanges 53 and 54. Bent hinge portion 68 is formed linearly along the area between each supporting portions 65 and flanges 53 and 54 in the left and right direction at a position except insertion opening 72 of supporting portion 65 in this embodiment.

When case member 14 is assembled, inflator 15 is press fitted into holding portion 45 from opening portion 40 and held in previously molded inner portion 22 first, and airbag 16 folded in a predetermined shape in a state where the retainer is inserted is fixed to bottom portion 39 by inserting retainer bolts of the retainer via through holes 46 and fastening the bolts using nuts, for example, and then inflator 15 and airbag 16 are housed in housing portion 31 (housing portion main body 33).

Next, jigs J2 are inserted into jig insertion holes 43 of inner portion 22 from the outside of housing portion 31 (housing portion main body 33), and jigs J1 are inserted into jig insertion holes 42 from the outside of housing portion 31 (housing portion main body 33), and protruding portions J1a at the leading ends of jigs J1 are respectively inserted into lock openings J2a of jigs J2 to combine jigs J1 and J2 in a grid shape.

Moreover, each lid 32 of inner portion 22 is folded back so as to be reversed and bent toward opening portion 40 of housing portion 31 by a corresponding one of bent hinge portions 68, and claw portion 71a of each hook portion 71 is inserted into and locked with a corresponding one of lock holes 58, while claw portion 82a of each locking protruding portion 82 is inserted into and locked with a corresponding one of lock holes 56 of flanges 51 and 52, thereby temporarily fixing each lid 32 to housing portion 31 via temporary fixing portions 78 and 83. In this state, supporting portion 65 is fitted to each recessed portion 61 and placed over flanges 53 and 54 while each protruding portion 59 is fitted to a corresponding one of insertion openings 72, and flanges 51 and 52 and the top surface of each protruding portion 59 (top surfaces of welding ribs 57 and 60) and each reversed and bent supporting portion 65 and the top surfaces of to-be-inner-door portions 66 (top surfaces of welding ribs 73 and 84) become substantially flush with each other, thereby forming, as a whole, a welding surface to be welded with outer portion 21. Moreover, hinge portions 67 are positioned at the front and rear edge portions of opening portion 40 in housing portion 31 (housing portion main body 33), while to-be-inner-door portions 66 cover opening portion 40 from above.

After the processing mentioned above, welding ribs 57, 60, 73, and 84 are melted in dimensions following the protruding direction, i.e., the vertical direction by vibration welding that relatively vibrates inner portion 22 with respect to outer portion 21 using a vibration welder in a state where previously and separately molded outer portion 21 is placed over inner portion 22. Inner outline portion 74 is welded to outer outline portion 25 and thus bonded together to form outline portion 75, while to-be-inner-door portions 66 are welded to to-be-outer-door portions 26 to form to-be-door portion 81. In the manner described above, airbag device 10 in which inflator 15 and airbag 16 are housed and held in housing portion 31 and covered by to-be-door portion 81 is completed.

Airbag device 10 thus completed is integrally attached to the inside of instrument panel 13 while electric line 17 is connected to the connector portion of inflator 15, and case member 14 is connected to the vehicle body side using a bracket (not illustrated) or the like, and clip 28 attached to attachment portion 27 of outer portion 21 is inserted and fixed to attachment opening portion 29.

When activation of airbag device 10 causes gas to flow into airbag 16, airbag 16 bulges out, i.e., inflates and deploys. The inflation force caused by this inflation of airbag 16 in case member 14 pushes up to-be-door portions 81 via to-be-inner-door portions 66 in the front and rear direction of inner portion 22. This force tears first tear line 24a and second tear line 24b of outer portion 21, i.e., tear line 24, which is a weak portion of outer portion 21, is torn away over the entire length, and to-be-outer-door portions 26 are thus separated off from the other portion of outer portion 21, thereby forming a door portion. While hinge portion 67 spreads out, to-be-door portions 81 turn, i.e., spread as a door portion, thereby forming a bulging port for airbag 16.

Note that, it is also possible to employ a configuration in which, when airbag 16 deploys, first tear line 24a tears over the entire length but only short sides of second tear line 24b tear on both sides, while the portion of second tear line 24b along hinge portion 67 does not tear partially or entirely and serves as an easily bendable hinge, instead of a configuration in which second tear line 24b tears over the entire length.

As described above, according to the present embodiment, case member 14 that is lighter in weight and that has the following configuration can be manufactured inexpensively. Case member 14 includes inner portion 22 including lids 32 extending outward from the front and rear edge portions of opening portion 40 of housing portion 31 that internally holds folded airbag 16 and inflator 15. In case member 14, lids 32 are reversed and bent toward opening portion 40 and fixed to housing portion 31 at a position where lids 32 at least partially cover airbag 16 housed in housing portion 31, and outer portion 21 is fixedly attached while covering at least positions of lids 32. Accordingly, case member 14 in which inflator 15 and folded airbag 16 are housed in housing portion 31 and covered by lids 32 can be provided without integration of a separately provided housing portion and lids, using an additional step or fixing the airbag or inflator using an additional component.

More specifically, case member 14 in which inflator 15 and folded airbag 16 are housed in housing portion 31 and covered by lids 32 can be easily configured and manufactured inexpensively by the following configuration. Supporting members 65 are connected in a deformable manner to flanges 53 and 54 extending to the front and rear edge portions of opening portion 40 of housing portion 31 via bent hinge portions 68, respectively. To-be-inner-door portions 66 are connected in a deformable manner to supporting portions 65 via hinge portions 67, respectively. Supporting portions 65 are placed over flanges 53 and 54 by reversal and bending of lids 32 toward opening portion 40 of housing portion 31 at bent hinge portions 68, respectively. In addition, hinge portions 67 are positioned within housing portion 31 while to-be-inner-door portions 66 cover opening portion 40.

Accordingly, airbag device 10, which is a shell-packing airbag module, can be provided more inexpensively and easily.

In addition, hinge portions 67 are each formed at a position extending laterally from housing portion 31 during molding of inner portion 22, so that a required hinge performance can be easily set without any limitation otherwise applicable to the shape of hinge portion 67 due to the configuration of a molding die for molding inner portion 22.

Moreover, protruding portions 59 provided to each of flanges 53 and 54 are inserted into insertion openings 72 of supporting members 65, respectively, by reversal and bending of lids 32 toward opening portion 40 of housing portion 31 at bent hinge portions 68, and become substantially flush with supporting members 65. Thus, the positioning of reversed and bent flanges 53 and 54 with supporting members 65 can be made easily, and the surface to which outer portion 21 is fixedly attached (welding surface of outer portion 21) can be easily formed.

Moreover, supporting to-be-inner-door portions 66 by jigs J1 and J2 when inner portion 22 is welded by vibration to outer portion 21 after insertion of jigs J1 and J2 into jig insertion holes 42 and 43 provided to inner portion 22 puts outer portion 21 and inner portion 22 together more closely, thereby fixedly attaching outer portion 21 and inner portion 22 to each other surely and easily.

Moreover, combining jigs J1 and J2 together in an intersecting manner (grid shape) effectively spreads the pressure applied from the direction of outer portion 21 during vibration welding (from above) and makes it possible to surely suppress bending (deflection) of jigs J1 and J2 and also to surely support lids 32.

Moreover, relatively thinner jigs J2 are used in the front and rear direction where the bending moment is relatively smaller because of the relatively shorter distance, while relatively thicker jigs J1 having a larger strength are used in the left and right direction where the bending moment is relatively larger because of the relatively longer distance. Thus, the strength against bending of jigs J1 and J2 can be secured. In addition, jigs J2 to be inserted through notch openings 86 of hinge portions 67 are relatively thinner, so that the opening area of notch openings 86 can be suppressed, and the strength of hinge portions 67 can be secured.

Moreover, temporarily fixing lids 32 to housing portion 31 by temporary fixing portions 78 and 83 in a state where lids 32 are reversed and bent toward opening portion 40 of housing portion 31 eliminates the need for holding lids 32 when outer portion 21 is fixedly attached to inner portion 22 (vibration welding), which provides favorable assembly performance and can further improve the manufacturability.

(Second Embodiment)

Figure 5:
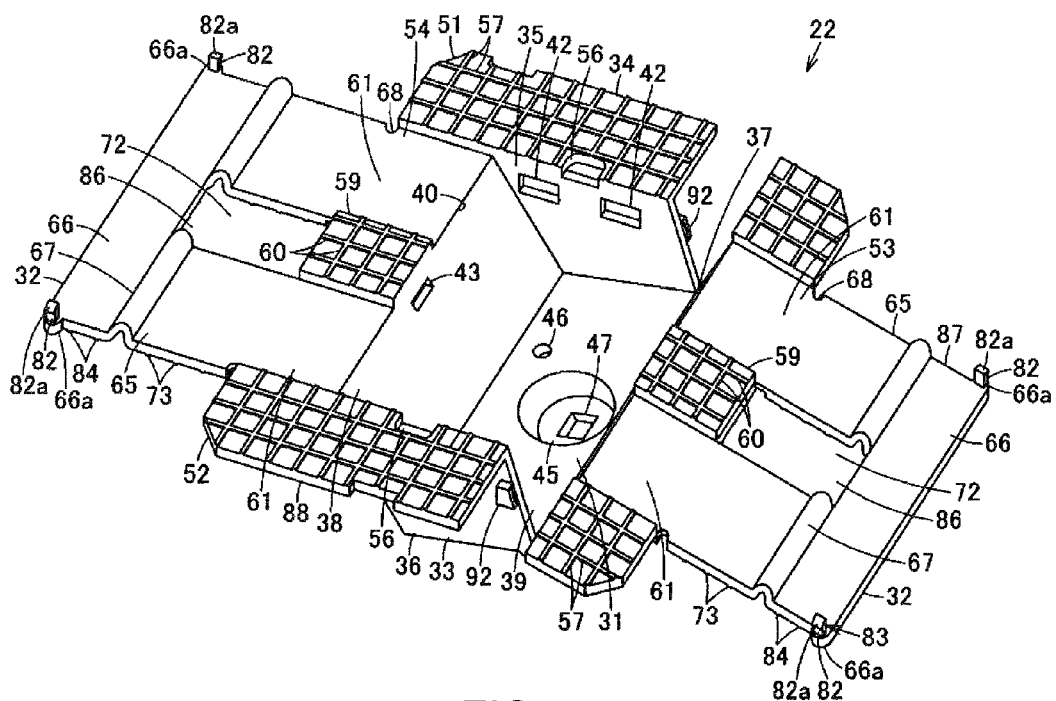
FIG. 5 is a perspective view illustrating some part of a second embodiment of a case member of an airbag device of the present invention.
Figure 6:
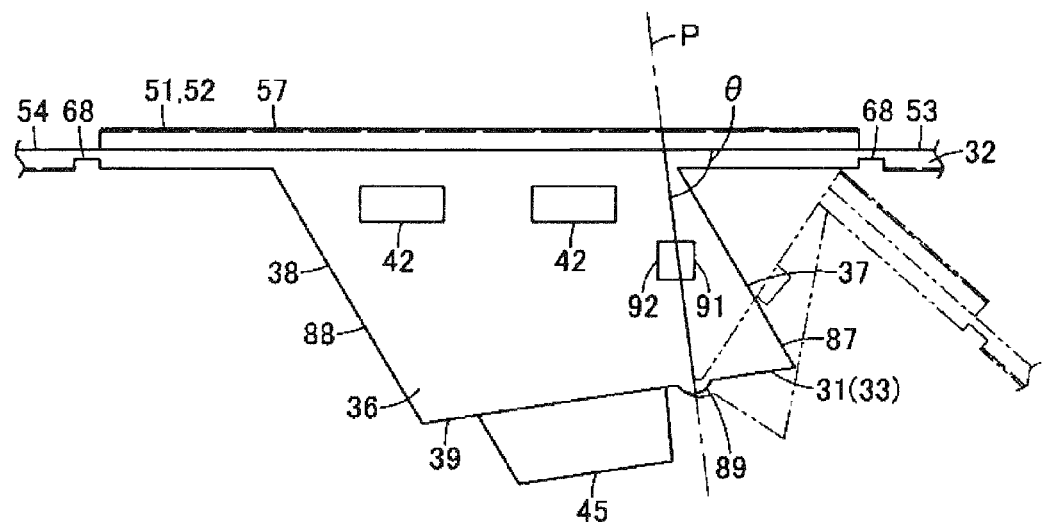
FIG. 6 is a side view of the case member of the airbag device described above.
Figure 7:
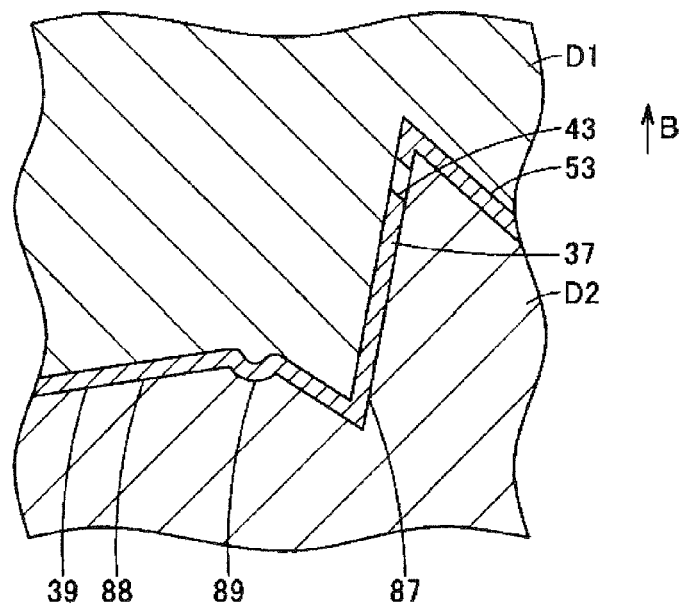
FIG. 7 is a cross-sectional view schematically illustrating some part of a molding die used for molding the case member described above.

Next, a second embodiment will be described with reference to FIGS. 5 to 7. Note that, the same components and actions as those of the first embodiment are assigned the same reference signs, and any redundant description will be omitted hereinafter.

In the second embodiment, front side surface potion 37 of housing portion 31 of inner portion 22 is inclined at an acute angle with respect to lid 32 (to-be-door portion 81), outer portion 21, and bottom portion 39. In addition, inner portion 22 is divided into front side portion 87 and rear side portion 88 at the front side portions of side surface portions 35 and 36 and bottom portion 39 of housing portion 31. Front side portion 87 is a portion including front side surface portion 37 (first portion), and rear side portion 88 is a portion excluding front side surface portion 37 (second portion). Moreover, front side portion 87 and rear side portion 88 are integrally and turnably connected to turnable hinge portion 89.

Front side surface portion 37 is inclined downwardly at an acute angle with respect to lid 32 (to-be-door portion 81) and outer portion 21 in a forward direction which is a turning direction of turnable hinge portion 89. Front side surface portion 37 is inclined upwardly at an acute angle with respect to the front end portion of bottom portion 39 in a rearward direction which is the other turning direction of turnable hinge portion 89.

In addition, front side portion 87 and rear side portion 88 are separated by virtual planar surface P along angle θ, which is an angle not greater than 90 degrees with respect to lid 32, at a position forward of holding portion 45, i.e., a position closer to front side surface portion 37. Accordingly, front side portion 87 includes a front side portion which is one side of planar surface P of front side surface portion 37, and side surface portions 35 and 36, a front side portion of bottom portion 39, a front side portion of front side lid 32 and flanges 51 and 52. Meanwhile, rear side portion 88 includes a rear side portion which is the other side of planar surface P of rear surface side portion 38, side surface portions 35 and 36, a rear portion including holding portion 45 of bottom portion 39, and a rear portion of rear side lid 32 and flanges 51 and 52.

Moreover, front side portion 87 and rear side portion 88 are respectively provided with connection fixing portions 91 and 92, which are to be connected together. Connection fixing portion 91 provided to front side portion 87 is formed at the front end portions of side surface portions 35 and 36 in front side portion 87, i.e., the position opposite to rear end portion 88 of side surface portions 35 and 36 (position divided by planar surface P), for example, and connection fixing portion 92 provided to rear side portion 88 is formed at the rear end portion of side surface portions 35 and 36 in rear side portion 88, i.e., the position opposite to front side portion 87 of side surface portions 35 and 36 (position divided by planar surface P). Connection fixing portions 91 and 92 are fixed to each other when one of connection fixing portions 91 and 92 is press-fitted to the other in the front and rear direction, which is the turnable direction of turnable hinge portion 89.

Note that, the rest of the structure of inner portion 22 is the same as that of the first embodiment.

When inner portion 22 is molded, molding is performed while the vertical direction, which is the thickness direction of lid 32, is set to the mold opening direction, i.e., draft direction (direction of arrow B). In this case, this structure of inner portion 22, which is to connect front side portion 87 including front side surface portion 37 and rear side portion 88 not including front side portion 37 to each other by turnable hinge 89 in a turnable way in the front and rear direction, allows for the design of molding dies D1 and D2 (FIG. 7), which avoids undercut for draft direction (direction of arrow B) of inner portion 22 by previously turning front side portion 87 with respect to rear side portion 88 by turnable hinge portion 89. Accordingly, there is no need to use an expensive molding die having a component such as a movable piece for undercut, for example. For this reason, inner portion 22 and case member 14 can be manufactured inexpensively. Inner portion 22 molded using molding dies D1 and D2 becomes identical to inner portion 22 of the first embodiment when front end portion 87 is turned toward rear side portion 88 by turnable hinge portion 89 to connect and fix front end portion 87 and rear side portion 88 to each other using connection fixing portions 91 and 92.

In particular, airbag device 10 in which front side surface portion 37 is inclined downwardly forward at an acute angle with respect to lid 32 (to-be-door portion 81) and outer portion 21 can be favorably used as a so called top-mount-type airbag device, which is configured to be installed at an upper portion of instrument panel 13 at a position facing the windshield.

Note that, in each of the embodiments, regarding lids 32, to-be-inner-door portion 66 may be formed to have an area that covers opening portion 40 (i.e., area substantially equal to opening portion 40), so that only single lid 32 may be provided for housing portion 31.

(Third Embodiment)

Figure 8:
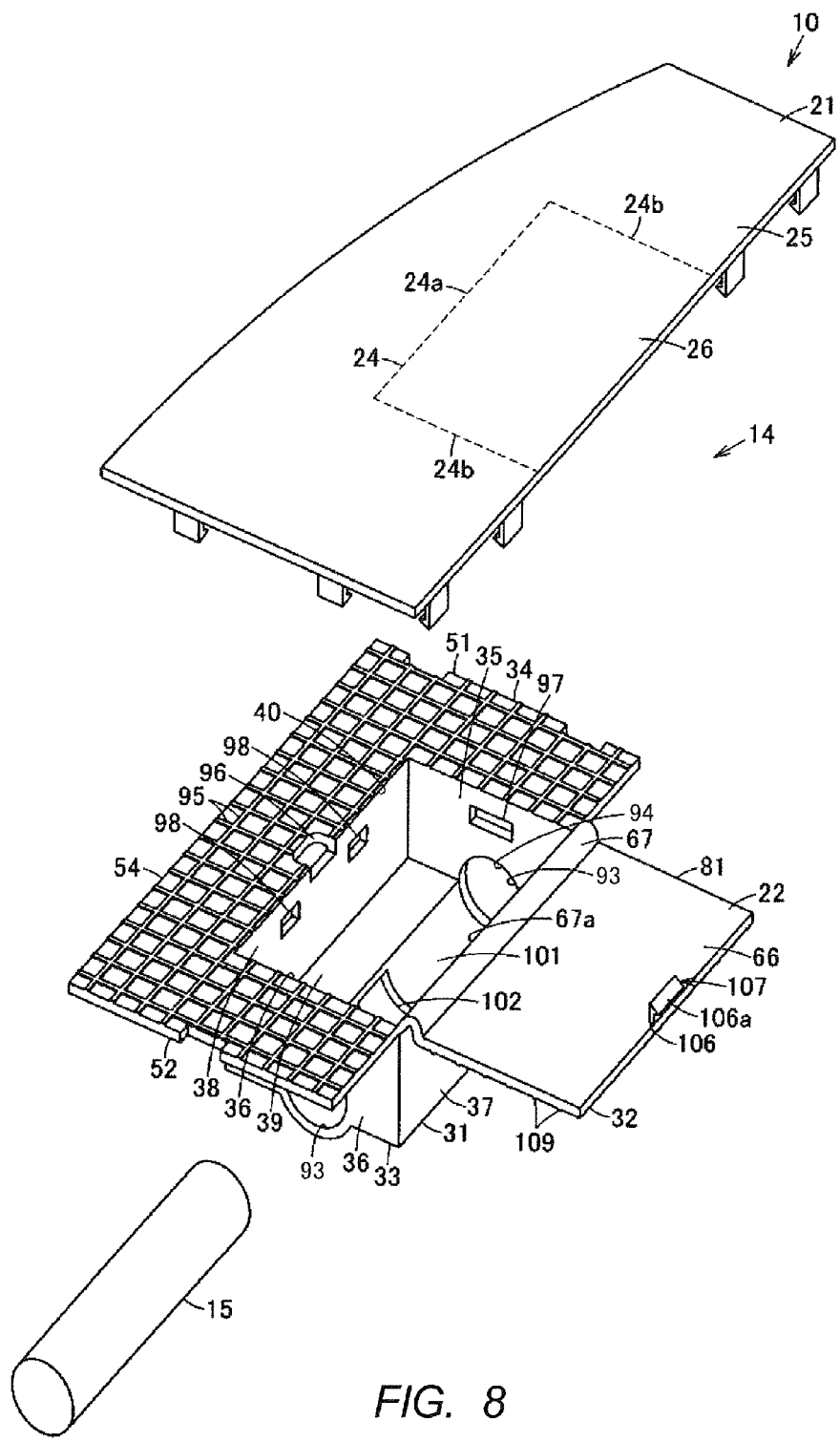
FIG. 8 is an exploded perspective view illustrating a third embodiment of a case member of an airbag device of the present invention.
Figure 9:
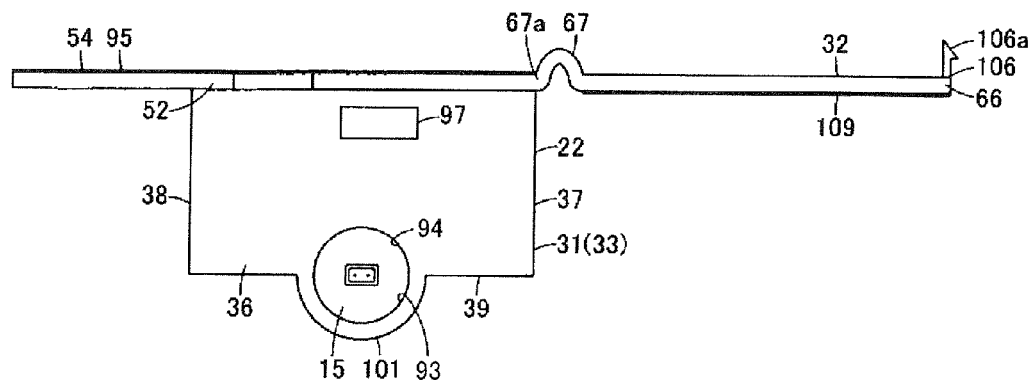
FIG. 9 is a side view of the case member of the airbag device described above.

Next, a third embodiment will be described with reference to FIGS. 8 to 10. Note that, the same components and actions as those of each embodiment described above are assigned the same reference signs, and any redundant description will be omitted hereinafter.

Airbag device 10 of the third embodiment includes a structure in which inflator 15 is formed in a substantially cylindrical shape, and only one to-be-door portion 81 of case member 14 is provided. The structure of airbag device 10 of the third embodiment is a so called single flap.

In outer portion 21, tear line 24 is formed in a right square bracket shape by first tear line 24a, and second tear lines 24b, respectively extending linearly forward from both ends of first tear line 24a to the front end portion of outer portion 21. In addition, the portion of outer portion 21 surrounded by tear line 24 serves as single to-be-outer-door portion 26, and the outer side of tear line 24 serves as outer outline portion 25.

Moreover, in inner portion 22, flange portion 34 of housing portion 31 is formed in a right square bracket shape by left flange 51, right flange 52, and rear flange 54. In addition, one lid 32 is integrally connected to the upper end portion of the front surface side portion 37 of housing portion main body 33 via hinge portion 67 in inner portion 22.

Flanges 51, 52, and 54 are integrally formed in an extended manner, and the top surfaces of flanges 51, 52, and 54, which face outer portion 21, are substantially flush with each other. The top surfaces of flanges 51, 52, and 54 include welding ribs 95 for vibration welding formed in a grid shape before welding of outer portion 21 (during molding of inner portion 22). Moreover, the center portion of rear side flange 54 in the left and right direction includes lock hole 96 for temporarily fixing lid 32 at the rear edge portion of opening portion 40, i.e., the position of the upper end portion of rear side surface portion 38.

In addition, housing portion 31 includes jig insertion holes 97 each having a square hole shape at the upper end portions of side surface portions 35 and 36 of housing portion main body 33, i.e., the positions near opening portion 40, respectively. Jig J3 (see FIG. 10) used in vibration welding between inner portion 22 and outer portion 21 is inserted from the outside of housing portion 31 (housing portion main body 33) to the inside thereof through jig insertion holes 97. Moreover, housing portion 31 includes jig insertion holes 98 each having a square hole shape at the upper end portions of rear surface portion 38, i.e., the positions near opening portion 40. Jigs J4 (see FIG. 10) used in vibration welding between inner portion 22 and outer portion 21 are inserted from the outside of housing portion 31 (housing portion main body 33) to the inside thereof through jig insertion holes 98, respectively.

Figure 10:
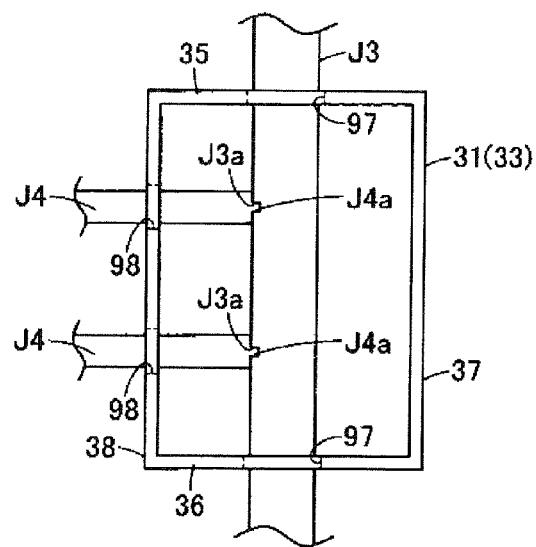
FIG. 10 is a plan view illustrating some manufacturing steps of the case member of the airbag device described above.

As illustrated in FIG. 10, jig J3 is formed in a linear stick shape using a metal member, for example, and is configured to be inserted through jig insertion holes 97 of side surface portions 35 and 36 in the left and right direction. Jig J3 is provided with lock openings J3a. Meanwhile, each jig J4 is formed in a linear stick shape having a smaller thickness than jig J3, using a metal member, for example. Moreover, jigs J4 are each configured to be inserted into jig insertion holes 98 of rear side surface portion 38 to the inner side of housing portion main body 33 (housing portion 31) toward the center portion in the front and rear direction, respectively. The leading ends of jigs J4 are provided with protruding portions J4a, which are inserted into and locked with lock openings J3a. Jigs J3 and J4 are combined in a grid shape and thus disposed in a planar shape at the lower portion of lid 32 at the position of opening portion 40, thereby supporting lid 32 from below against the pressure applied from above during vibration welding.

Moreover, bottom portion 39 of housing portion main body 33 of housing portion 31 is provided with holding portion 101 configured to hold inflator 15 and formed by making a downward recess. Holding portion 101 is formed in a semi-cylindrical shape along the outer peripheral surface of inflator 15 and in a longitudinal shape along the left and right direction. Holding section 101 includes exposed opening 102 through which the connector portion of inflator 15 is exposed. Moreover, the left and right ends of holding portion 101 communicate with circular insertion openings 93 which penetrate through side surface portions 35 and 36, respectively. Inflator 15 is configured to be inserted into holding portion 101 through one of insertion openings 93 to the other. Accordingly, the upper edge portions of insertion openings 93 serve as press-holding portions 104 that hold inflator 15 from above to prevent inflator 15 coming off from holding portion 101.

Moreover, lid 32 is formed by to-be-inner-door portion 66 and hinge portion 67.

To-be-inner-door portion 66 is configured to cover airbag 16 housed in opening portion 40 and housing portion 31 in a state where lid 32 is reversed and bent toward opening portion 40 of housing portion 31 at the position of hinge portion 67. To-be-inner-door portion 66 is formed in a plate shape extending in a planar shape along the direction orthogonal to the deployment direction of airbag 16 and is formed to have an area that covers opening portion 40 (i.e., area substantially equal to opening portion 40) and fixedly attached to the back surface side of to-be-outer-door portion 26, thereby forming to-be-door portion 81. Moreover, lock protruding portion 106 to be inserted into and locked with lock hole 96 is formed in a thickness direction at the center portion of the left and right direction of the side of to-be-inner-door portion 66 opposite to the side of hinge portion 67 (side opposite to housing portion 31). Lock protruding portion 106 includes claw portion 106a protruding forward. In addition, lock protruding portion 106 and lock hole 96 form temporary fixing portion 107 that temporarily fixes lid 32 to housing portion 31 in a state where lid 32 is reversed and bent toward opening portion 40 of housing portion 31 at the position of the front edge portion of opening portion 40. Moreover, welding ribs 109 for vibration welding are formed in a grid shape on to-be-inner door portion 66 before welding of outer portion 21 (during molding of inner portion 22). Welding ribs 109 are formed on the back surface side of to-be-inner-door portion 66, i.e., the side opposite to the side of outer portion 21 (side opposite to to-be-outer-door portion 26) during molding of inner portion. Welding ribs 109 become substantially flush with welding ribs 95 of flanges 51, 52, and 54 and are fixedly attached to the back surface side of to-be-outer-door portion 26 of outer portion 21 in a state where lid 32 is reversed and bent toward opening portion 40 of housing portion 31 at the position of the front edge portion of opening portion 40.

Hinge portion 67 curves in a U-shape and flexibly connects the front edge portion of opening portion 40, i.e., the upper end portion of front side surface portion 37 (housing portion 31 (housing portion main body 33)) and to-be-inner-door portion 66. Moreover, hinge portion 67 bulges out upward during molding of inner portion 22, and in a state where lid 32 (to-be-inner-door portion 66) is reversed and bent toward housing portion 31 (opening portion 40) at the position of the front edge portion of opening portion 40 (rear edge portion 67a on the side of housing portion 31), hinge portion 67 is inserted into opening portion 40 and positioned near the upper end portion of side surface portion 37 in housing portion 31 (housing portion main body 33) and curves so as to bulge out downwardly, i.e., the direction toward housed airbag 16. Moreover, hinge portion 67 extends between the lateral ends of to-be-inner-door portion 66 along the front edge portion of opening portion 40, i.e., the upper end portion of front side surface portion 37.

When case member 14 is assembled, first, inflator 15 is inserted into holding portion 101 through insertion openings 93 of previously molded inner portion 22, and the two end portions of inflator 15 are pressed and held from above by press-holding portions 94. Moreover, while airbag 16 folded into a predetermined shape is fixed to bottom portion 39, inflator 15 and airbag 16 are housed in housing portion 31 (housing main body 33).

Next, jig J3 is inserted into jig insertion holes 97 of inner portion 22 from the outside of housing portion 31 (housing portion main body 33) while jigs J4 are respectively inserted into jig insertion holes 98 from the outside of housing portion 31 (housing portion main body 33) and protruding portions J4a at the leading ends of jigs J4 are inserted into and locked with lock openings J3a of jig J3, respectively, thereby combining jigs J3 and J4 in a "π" shape.

Moreover, lid 32 of inner portion 22 is folded back so as to be reversed and bent toward opening portion 40 of housing portion 31 at the position of rear edge portion 67a of hinge portion 67, and claw portion 106a of lock protruding portion 106 is inserted into and locked with lock hole 96, thereby temporarily fixing lid 32 to housing portion 31 by temporary fixing portion 107. In this state, the top surfaces of flanges 51, 52, and 54 (top surfaces of welding ribs 95), and the top surface of reversed and bent to-be-inner-door portion 66 (top surfaces of welding ribs 109) become substantially flush with each other, thereby forming, as a whole, the welding surface where outer portion 21 is welded, and covering opening portion 40 from above by to-be-inner-door portion 66 while hinge portion 67 is positioned at the front edge portion of opening portion 40 in housing portion 31 (housing portion main body 33).

Subsequently, welding ribs 95 and 109 are melted in dimensions along the protruding direction, i.e., the vertical direction by vibration welding to relatively vibrate inner portion 22 with respect to outer portion 21 using a vibration welding machine in a state where previously and separately molded outer portion 21 is placed over inner portion 22. Inner outline portion 74 is thus welded and bonded to outer outline portion 25 to form outline portion 75, while to-be-inner-door portion 66 is welded to to-be-outer-door portion 26 to form to-be-door portion 81. In this manner, airbag device 10 in which inflator 15 and airbag 16 are housed and held in housing portion 31 and covered by to-be-door portion 81 is completed.

When activation of airbag device 10 attached to instrument panel 13 as in the case of each of the embodiments described above causes gas to flow into airbag 16, airbag 16 bulges out, i.e., inflates and deploys. The inflation force caused by this inflation of airbag 16 in case member 14 pushes up to-be-door portion 81 via to-be-inner-door portion 66 in the front and rear direction of inner portion 22. This force tears first tear line 24a and second tear lines 24b of outer portion 21, i.e., tear line 24, which is a weak portion of outer portion 21, is torn away over the entire length, and to-be-outer-door portion 26 is thus separated off from the other portion of outer portion 21, thereby forming a door portion. While hinge portion 67 spreads out, to-be-door portion 81 turns, i.e., deploys as a door portion, thereby forming a bulging port for airbag 16.

As described above, to-be-inner-door portion 66 and housing portion 31 are connected together in a deformable manner via hinge portion 67 that extends to the front edge portion of opening portion 40 of housing portion 31, and to-be-inner-door portion 66 covers opening portion 40 while hinge portion 67 is positioned within housing portion 31 by reversal and bending toward opening portion 40 of housing portion 31 at the position of the front edge portion of opening portion 40 (rear edge portion 67a of hinge portion 67). Thus, case member 14 in which inflator 15 and folded airbag 16 are housed in housing portion 31 and covered by lid 32 can be configured in a more simplified manner and can be manufactured more inexpensively. Accordingly, airbag device 10, which is a shell-packing airbag module, can be provided more inexpensively and easily.

In particular, providing lid 32 to only one edge portion (front edge portion) of opening portion 40 of housing portion 31 allows airbag device 10 to be suitably used as a so called single flap type airbag device.

In addition, supporting to-be-inner-door portion 66 by jigs J3 and J4 when outer portion 21 is welded by vibration while jigs J3 and J4 are inserted into jig insertion holes 97 and 98 provided to inner portion 22 makes it possible to surely put outer portion 21 and inner portion 22 together closely to each other and to fixedly attach outer portion 21 to inner portion 22 securely and easily.

Moreover, combining jigs J3 and J4 together in an intersecting manner makes it possible to more surely suppress bending (deflection) of jigs J3 and J4 and more surely support lid 32 by effectively spreading the pressure applied from the direction of outer portion 21 (from above) during vibration welding.

Moreover, insertion of jigs J4 into jig J3 only from the rear side, which is the side opposite to lid 32, eliminates the need for providing a notch opening for inserting a jig into hinge portion 67 and thus allows for easily setting a desired strength of hinge portion 67.

Moreover, temporarily fixing lid 32 to housing portion 31 by temporary fixing portion 107 in a state where lid 32 is reversed and bent toward opening portion 40 eliminates the need for pressing and holding lid 32 when outer portion 21 is fixedly attached to inner portion 22 (vibration welding) and thus provides favorable assembly performance and can further improve the manufacturability.

Furthermore, a pair of lids 32 in the front and rear direction may be provided for housing portion 31 in the third embodiment described above.

In each of the embodiments, case member 14 may further include a surface skin on the top surface side of outer portion 21.

Additionally, airbag device 10 can be used as an airbag device not only for the front-passenger seat, but also for the driver seat, for example.

As described above, according to the case member of the airbag device in the first to the third embodiments, the case member that is lighter in weight and that has the following configuration can be manufactured inexpensively. The case member includes the inner portion including a lid extending from the edge portion of the opening portion of the housing portion that internally holds the folded airbag and inflator. In the case member, the lid is reversed and bent toward the opening portion and fixed to the housing portion at a position where the lid at least partially covers the airbag housed in the housing portion, and the outer portion is fixedly attached while covering at least the position of the lid. Accordingly, the case member in which the inflator and folded airbag are housed in the housing portion and covered by the lid can be provided without integration of a separately provided housing portion and lid, using an additional step or fixing the airbag or inflator using an additional component.

Moreover, according to the case member of the airbag device in the first to the third embodiments, in addition to the effects brought about by the case member of the airbag device describe above, the case member in which the inflator and the folded airbag are housed in the housing portion and covered by the lid can be easily formed and manufactured more inexpensively by connecting the supporting portion, via the hinge portion, to the support receiving member extending to the edge portion of the opening portion of the housing portion in a deformable manner, connecting the to-be-inner-door portion to the supporting member via the hinge portion in a deformable manner while the supporting member is placed over the support receiving member by bending of the lid toward the opening portion of the housing portion at the bent hinge portion, and covering the opening portion by the to-be-inner-door portion while the hinge portion is positioned within the housing portion.

Furthermore, according to the case member of the airbag device in the first to the third embodiments, in addition to the effects brought about by the case member of the airbag device, the protruding portion provided to the support receiving portion is inserted into the insertion opening of the supporting portion by bending of the lid toward the opening portion of the housing portion at the bent hinge portion and becomes substantially flush with the supporting portion. Thus, the positioning of the bent support receiving member with the supporting portion can be easily made, and the surface to which the outer portion is fixedly attached can be formed easily.

Moreover, according to the case member of the airbag device in the first to the third embodiments, in addition to the effects brought about by the case member of the airbag device, the case member in which the inflator and the folded airbag are housed in the housing portion and covered by the lid can be formed in a more simplified manner and manufactured more inexpensively by connecting the to-be-inner-door portion in a deformable manner to the housing portion via the hinge portion that extends to the edge portion of the opening portion of the housing portion and covering the opening portion by the to-be-inner-door portion while the hinge portion is positioned within the housing portion by the bending toward the opening portion of the housing portion at the hinge portion.

Moreover, according to the case member of the airbag device in the first to the third embodiments, in addition to the effects brought about by the case member of the airbag device, a molding die can be designed in which the surface side including the side surface portion inclined at an acute angle with respect to the lid is previously turned by the turning hinge portion with respect to the surface side that does not include this side surface portion, so as to avoid undercut of the angle of the side surface portion in the draft direction of the inner portion. Thus, there is no need to use an expensive molding die having a component such as a movable piece for undercut, for example, and the inner portion and case member can be thus manufactured more inexpensively.

Moreover, according to the case member of the airbag device in the first to the third embodiments, in addition to the effects brought about by the case member of the airbag device, supporting the to-be-inner-door portion using jigs when the outer portion is welded by vibration after insertion of jigs into the jig insertion holes provided to the inner portion makes it possible to surely put the outer portion and inner portion together closely to each other and to fixedly attach the outer portion to the inner portion securely and easily.

Moreover, according to the case member of the airbag device in the first to the third embodiments, in addition to the effects brought about by the case member of the airbag device, temporarily fixing the lid to the housing portion by the temporary fixing portion in a state where the lid is reversed and bent toward the opening portion eliminates the need for pressing and holding the lid when the outer portion is fixedly attached to the inner portion, thus provides favorable assembly performance and can improve the manufacturability.

Next, a fourth embodiment of the airbag device according to the present invention will be described with reference to drawings.

(Fourth Embodiment)

Figure 11:
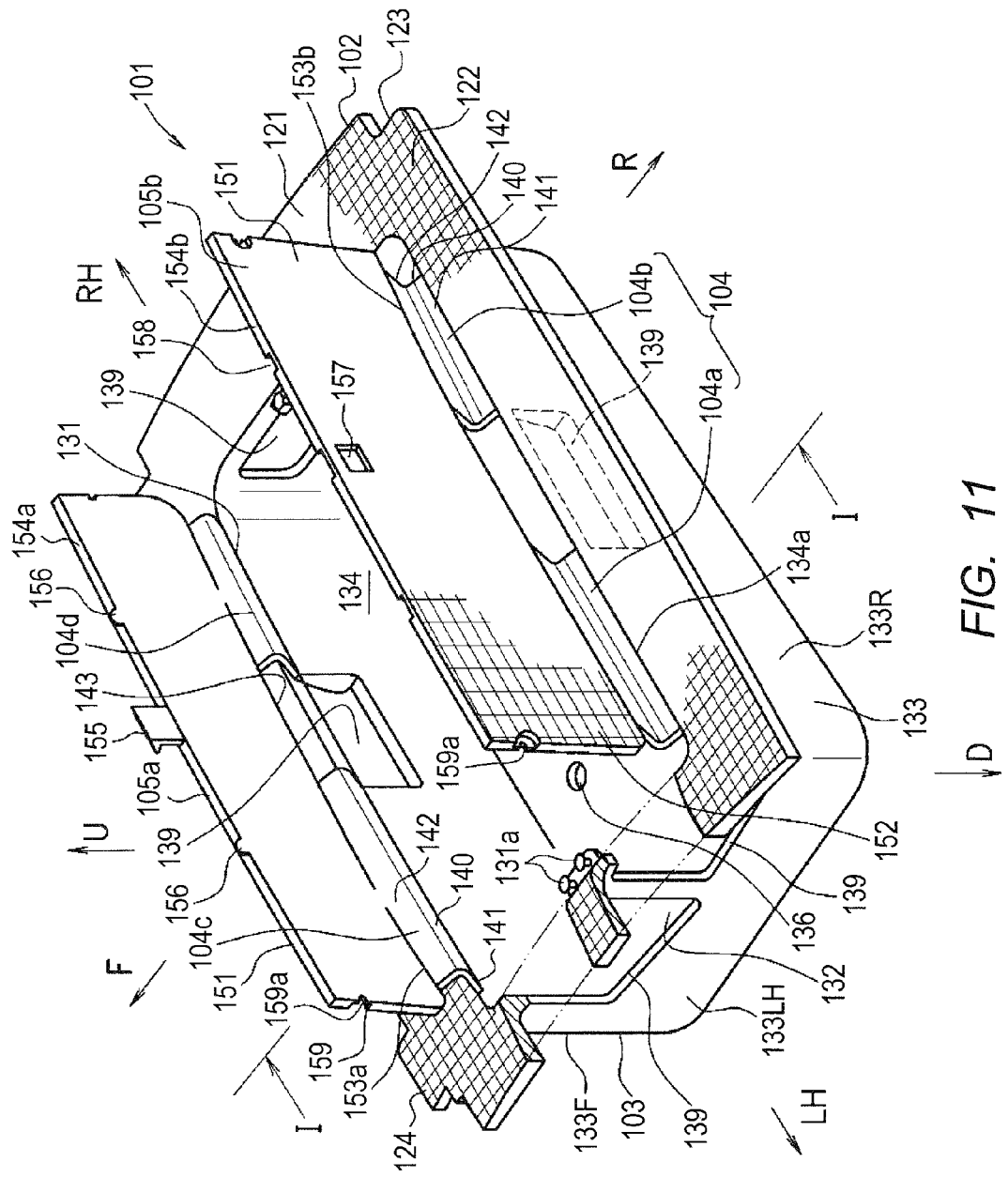
FIG. 11 is a single perspective view illustrating a fourth embodiment of an inner portion serving as a container portion used for a case member of an airbag device of the present invention.
Figure 12:
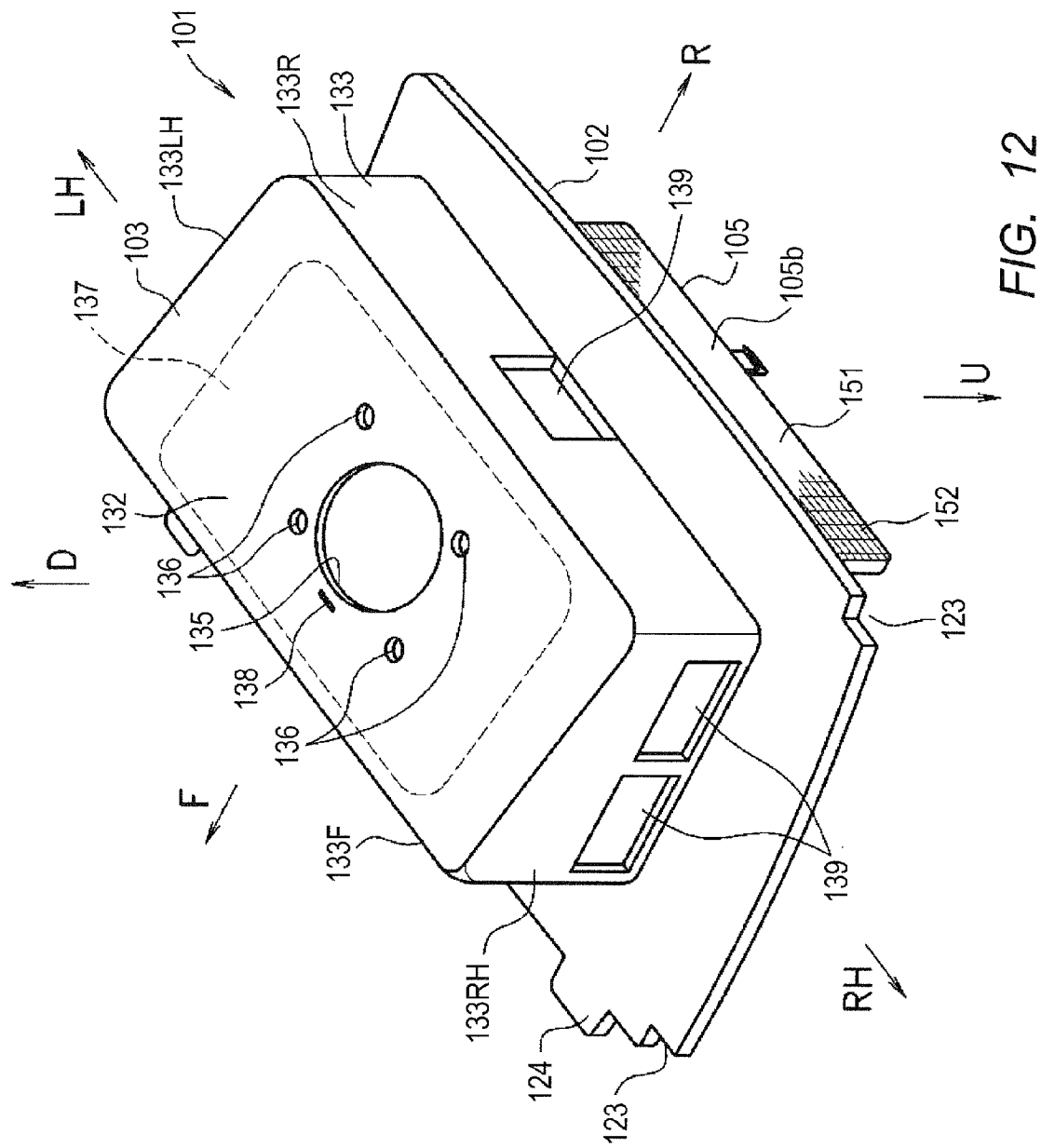
FIG. 12 is a single perspective view illustrating the inner portion used for the case member of the airbag device described above when viewed from a different angle.

FIGS. 11 and 12 are each a single perspective view of inner portion 101 serving as a container portion. FIG. 11 illustrates a bulging side of the airbag and FIG. 12 illustrates the side opposite to the bulging side. For the convenience of description, a description will be given using the following terms: the airbag bulging side is referred to as "upper side" (U-side) and the side opposite to the bulging side is referred to as "downward side" (D-side).

Inner portion 101 is formed by injection molding an olefin-based thermoplastic elastomer (TPE) and includes flange portion 102 having a substantially rectangular frame shape, container main body 103, and lid 105 serving as a backing portion integrally molded with upper edge portion 131 of container main body 103 via hinge 104.

Flange portion 102 is provided with ribs 122 formed for welding on substantially the entire surface of top surface portion 121 in a grid shape (illustration is partially omitted in FIG. 11). Notch 123 or tab 124 are also provided for positioning with or for avoiding interference with an outer panel to be described hereinafter or an instrument panel (not illustrated), for example.

Container main body 103 is a box shape having opening portion 134 and includes bottom portion 132 and peripheral wall portion 133.

Bottom portion 132 includes one through hole 135 (large) and four though holes 136 (small) formed by drilling. Large through hole 135 is used for inserting a gas injection portion of an inflator and small through holes 136 are used for inserting stud bolts 173 for fixing an airbag to be described hereinafter. Four through holes 136 are provided at substantially equal intervals along the peripheral portion of large through hole 135 in the present embodiment. Steel plate 137, which is a reinforcement member including the peripheral portion of through holes 135 and 136, is integrally molded with bottom portion 132 so as to be embedded in bottom portion 132. Slit 138 receives an insertion piece (not illustrated) of retainer ring 174 incorporated into packing main body 171 of the airbag to be described hereinafter, thereby enabling a correct assembly position of packing main body 171 to be identified.

Peripheral wall portion 133 includes front wall portion 133F at the front position (arrow F direction), rear wall portion 133R at the rear position (arrow R direction), and left wall portion 133LH and right wall portion 133RH on the left and right sides (arrow LH and RH), respectively. In addition, one square hole 139 is provided to each of front and rear wall portions 133F and 133R, and two square holes 139 are provided to each of left and right wall portions 133LH and 133RH near opening portion 134.

Each hinge 104 includes a pair of inclined portions 141 and 142, and bottom portion 140 connecting between inclined portions 141 and 142 in side view and is separated into two parts for connecting corresponding lid 105 (105a or 105b) with upper edge portion 131 while the position corresponding to square hole 139 is defined as discontinuous portion 143 for front and rear wall portion 133F or 133R. Hinge 104 has somewhat a smaller thickness than flange portion 102, container main body 103, or lid 105, and is thus made operable as a hinge having flexibility as compared to the other portions.

As illustrated in FIG. 11, lid 105 includes front side lid portion 105a and rear side lid portion 105b standing substantially in parallel with each other and leaves opening portion 134 entirely open. More specifically, lid 105 is formed in a state that allows an object having a height and width that can be housed in container main body 103 (packing main body 171 of airbag) to be put into container main body 103 through opening portion 134 without any difficulty. Ribs 152, which form a grid shape, as in the case of top surface portion 121 of flange portion 102, are formed on substantially the entire surfaces of outer surfaces 151, which correspond to the surfaces in the front direction of front side lid portion 105a and in the rear direction of the rear side lid portion 105b (illustration is partially omitted in FIGS. 11 and 12). Base portion 153 (153a) of front side lid portion 105a is connected to upper edge portion 131 via hinges 104c and 104d, while base portion 153 (153b) of rear side lid portion 105b is connected to upper edge portion 131 via hinges 104a and 104b.

Leading end portions 154 of lid 105 on the side opposite to base portions 153 of lid 105 have a mutually connectable structure. More specifically, leading end portion 154a of front side lid portion 105a includes hook 155 at an intermediate position of the left and right direction and shelf supporting portions 156 on both sides of hook 155. Meanwhile, leading end portion 154b of rear side lid portion 105b includes fitting hole 157 at an intermediate position of the left and right direction and shelf supporting recess portions 158 on both sides of fitting hole 157. In addition, lateral side portions 159 of each of lid portions 105a and 105b are each provided with a substantially semicircular stepped recess portion 159a.

The component configuration of front-passenger seat airbag module 160 using inner portion 101 as described above is one that illustrated in FIG. 13. More specifically, front-passenger seat airbag module 160 substantially includes packing main body 171 of folded airbag 170, inflator 180, and outer portion 190 serving as a covering portion having the texture similar to that of the other design surface of the instrument panel.

Packing main body 171 keeps airbag 170 that has been folded in consideration of deployment, using wrapping member 172 made of fabric or resin impregnated sheet without causing a folding collapse. Retainer ring 175 is inserted into airbag 170 in advance before airbag 170 is folded (see FIG. 15B), and stud bolts 173 standing from retainer ring 175 protrude from the lower surface of packing main body 171. Wrapping member 172 includes perforation 174 across the center of packing main body 171 substantially in the longitudinal direction of packing main body 171, and tearing of perforation 174 due to inflation of airbag 170 easily releases the restraint of airbag 170.

Outer portion 190 is formed by injection molding a polypropylene resin and includes top surface portion 191, which is a design surface and is matched to the design surface of the instrument panel including a color tone, gloss, or texture pattern, for example, and thus presents a harmonized exterior as a whole instrument panel. Bonding claws 192 integrally molded with the peripheral portion of outer portion 190 are fitted to the receiving portions of the installed position of an instrument panel (not illustrated) where outer portion 190 is attached.

Figure 13:
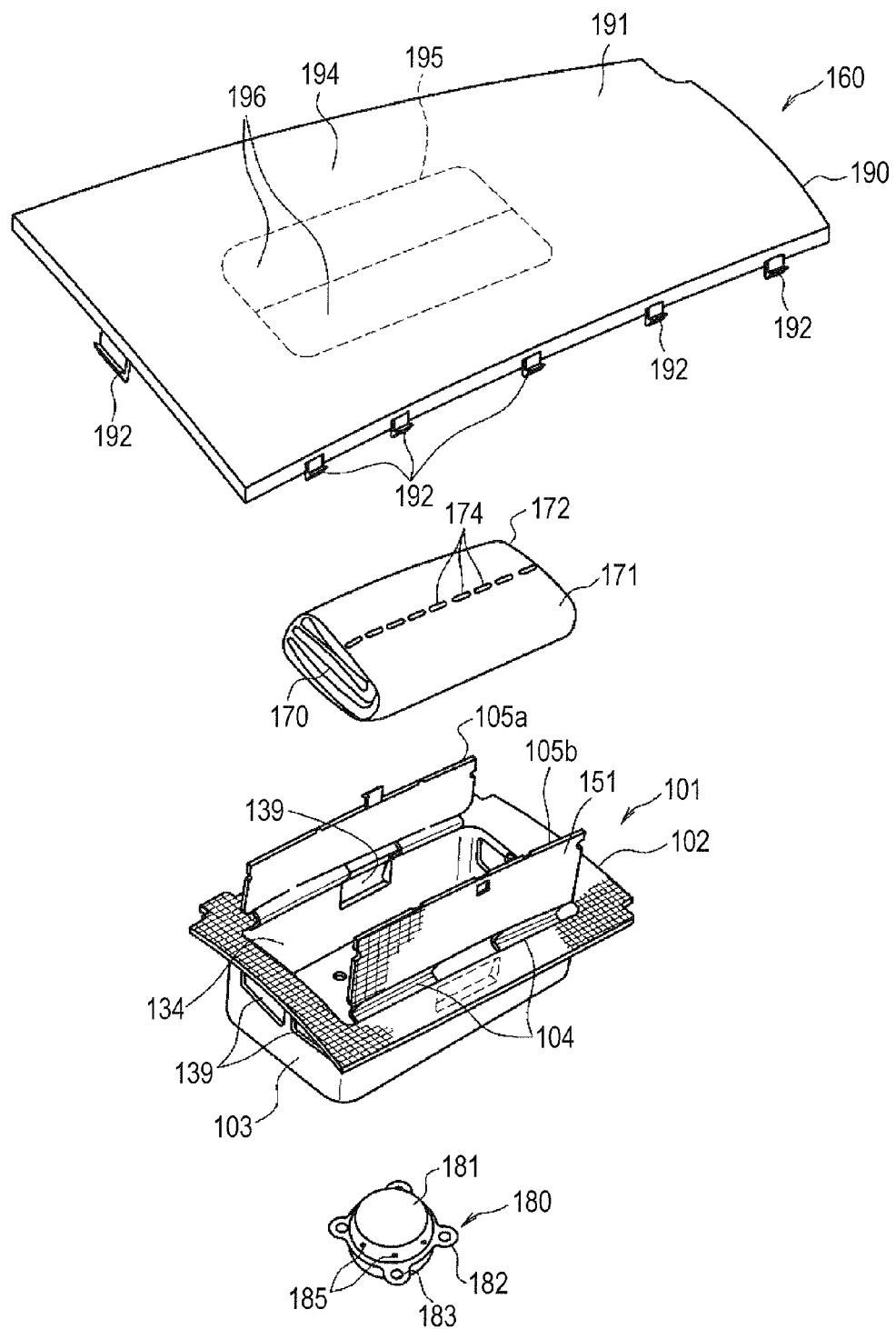
FIG. 13 is an exploded perspective view illustrating primary configuration elements of the airbag device described above.
Figure 14:
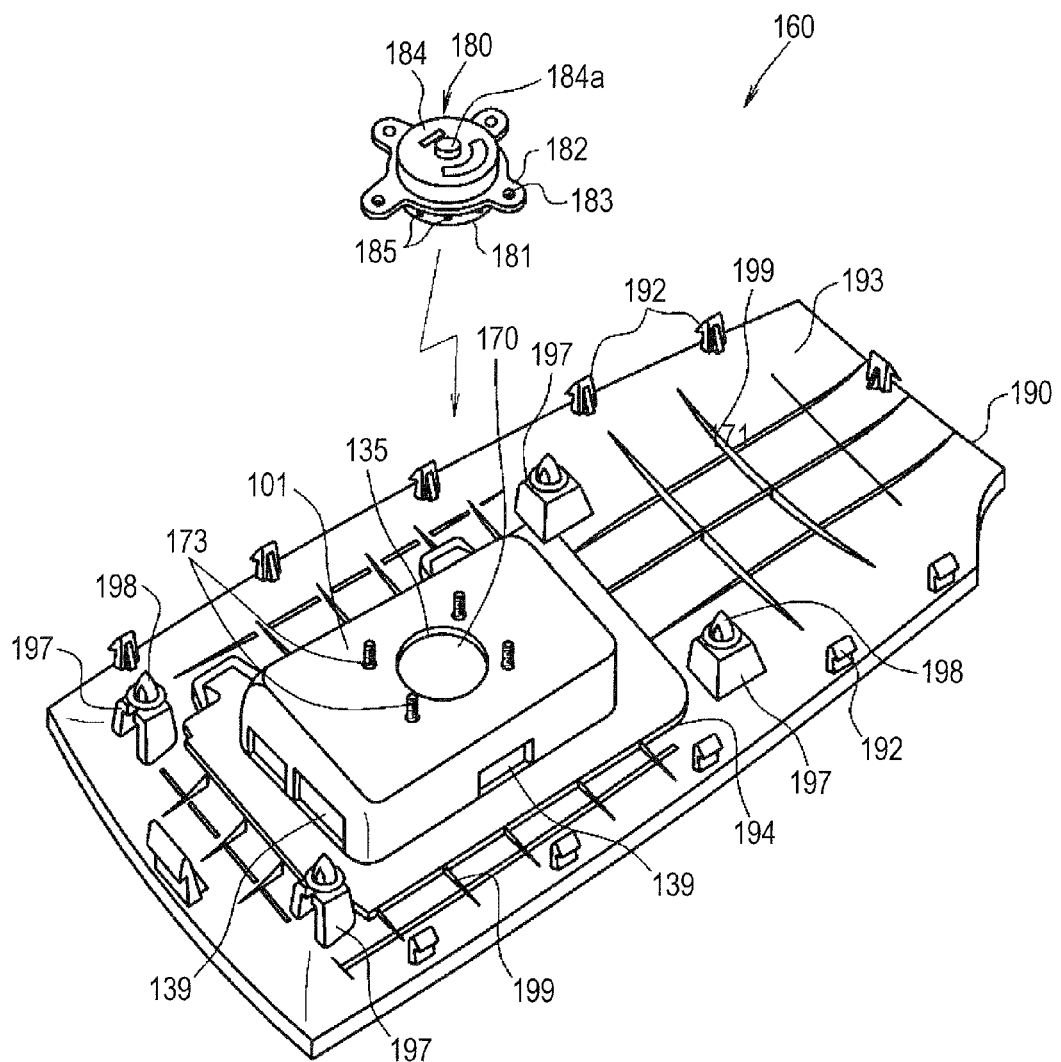
FIG. 14 is an exploded perspective view illustrating, from a different angle, the state where some of the primary configuration elements illustrated in FIG. 13 are assembled.

As illustrated in FIGS. 13 and 14, tear line (trench portion) 195 is formed on undersurface portion 193 so as to draw "two adjacent rectangles" in airbag module area 194 to which inner portion 101 is attached. Tear line 195 defines to-be-door portion 196 for bulging out of airbag 170. Tear line 195 is configured to tear, thereby forming an opening allowing airbag 170 to bulge out. Top surface portion 191, which is a design surface, has no trench and is a seamless instrument panel, which does not emphasize the presence of the airbag module, or is an airbag cover so called an invisible airbag lid.

Moreover, the four corners of airbag module area 194 are respectively provided with standing clip bases 197 each having a box shape and clip 198 configured to be fitted to a supporting bracket on the instrument panel (not illustrated) side to regulate movement to the upper side (U side) of airbag modulation are 194 or separation. Ribs 199 in a grid shape are appropriately formed on undersurface portion 193 and provide rigidity as a panel body of outer portion 190.

Figure 15A:
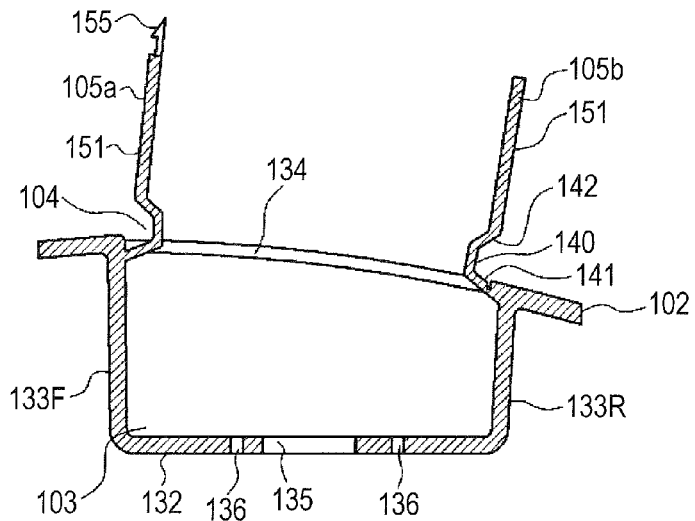
FIG. 15A is a diagram for describing an assembly procedure of the airbag device described above.

FIG. 14 is a diagram illustrating a state where inner portion 101 including packing main body 171 housed therein is integrally bonded to outer portion 190, viewed from D side, and the inside of folded airbag 170 can be observed from large through hole 135. Top portion 181 of inflator 180 is inserted into through hole 135, and stud bolts 173 of retainer ring 175 are inserted into through holes 183 of attachment flange 182, thereby fixing inflator 180 to bottom portion 132 using lock nuts (not illustrated). Connector 184a for connecting a wire harness (not illustrated) is provided at the center of lower portion 184. Inserting upper portion 181 into airbag 170 through large through hole 135 makes gas ports 185 drilled around the circumferential surface of upper portion 181 positioned within airbag 170. As illustrated in FIG. 15A corresponding to I-I cross-section of FIG. 11, although hinge 104 slightly protrudes inside of opening portion 134, opening portion 134 is almost full open.

Figure 15B:
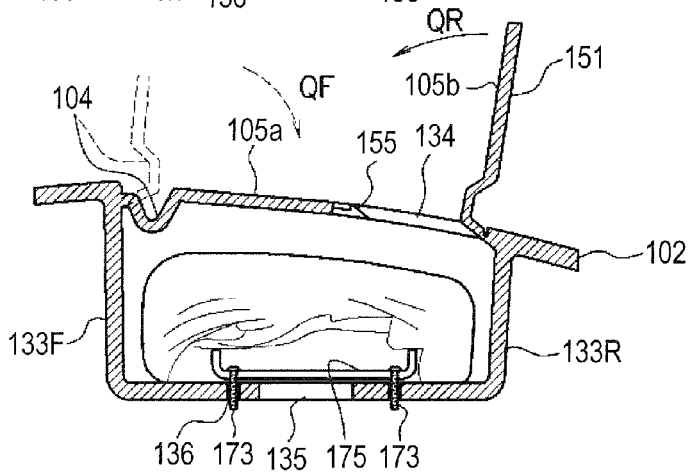
FIG. 15B is another diagram for describing the assembly procedure of the airbag device described above.

As illustrated in FIG. 15B, packing main body 171 is put into container main body 103. Although hinge 104 somewhat reduces the size of opening portion 134, as described above, hinge 104 is more flexible than flange portion 102, container main body 103 or lid 105, thus deforms relatively easily and allows packing main body 171 to pass through opening portion 134. Stud bolts 173 are pulled from through holes 136, and lid 105 (lid portions 105a and 105b) is turned around hinge 104 as illustrated in arrows QF and QR to match leading end portions 154. Shelf receiving portions 156 overlap shelf receiving recess portions 158, and hook 155 fits to fitting hole 157. In addition, stepped recess portions 159a fit to hooks 131a of upper end portion 131, each having a mushroom shape (see FIG. 11, and illustration is omitted in FIG. 13). In this manner, lid 105 (105a and 105b) closes opening portion 134 and is temporarily held, and lid 105 and flange portion 102 together form substantially single curved surface S.

Figure 15C:
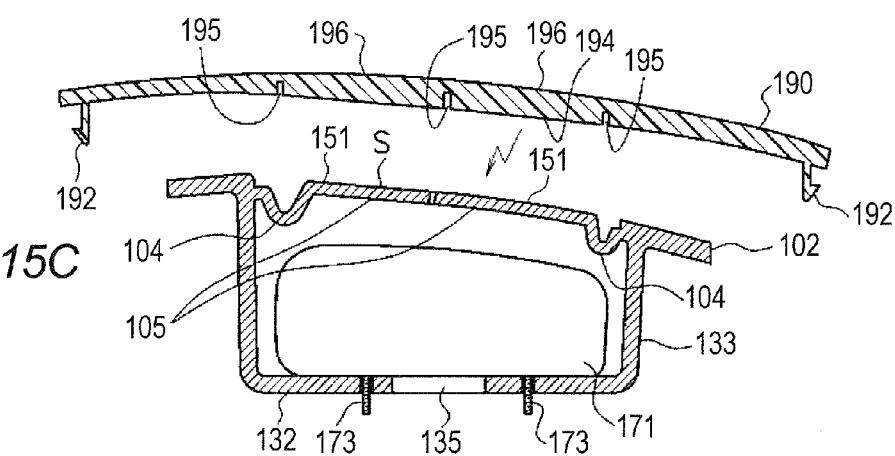
FIG. 15C is still another diagram for describing the assembly procedure of the airbag device described above.

Next, as illustrated in FIG. 15C, outer portion 190 is placed over curved surface S formed by flange portion 102 and lid 105. Note that, for the convenience of description, illustration of clip bases 197 and ribs 199 is omitted.

Figure 16A:
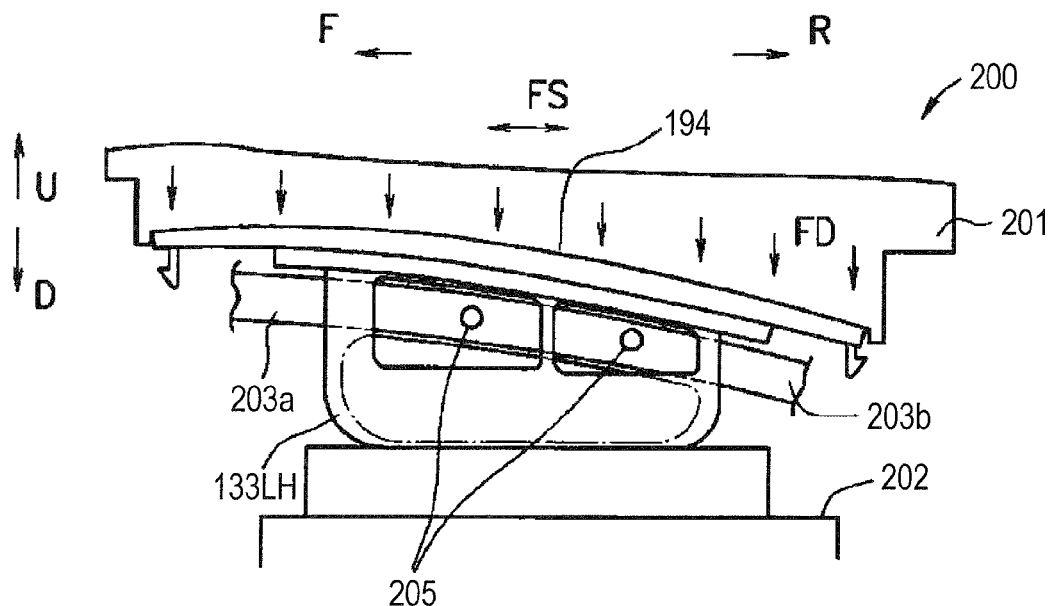
FIG. 16A is a diagram for describing an operation mode of an assembly apparatus for assembling the airbag device described above.

The structure formed by placing outer portion 190 over inner portion 101 is put on welding machine 200. FIG. 16A is a side view as observed from left wall portion 133LH. In welding machine 200, outer portion 190 and inner portion 101 are respectively positioned to top base 201 and bottom base 202. In addition, while top base 201 generates downward pushing force FD (direction of arrow D) with respect to bottom base 202 fixed to a frame (not illustrated), top base 201 is attached to the frame along curved surface S so as to cause vibration FS in lateral direction F-R.

Figure 17A:
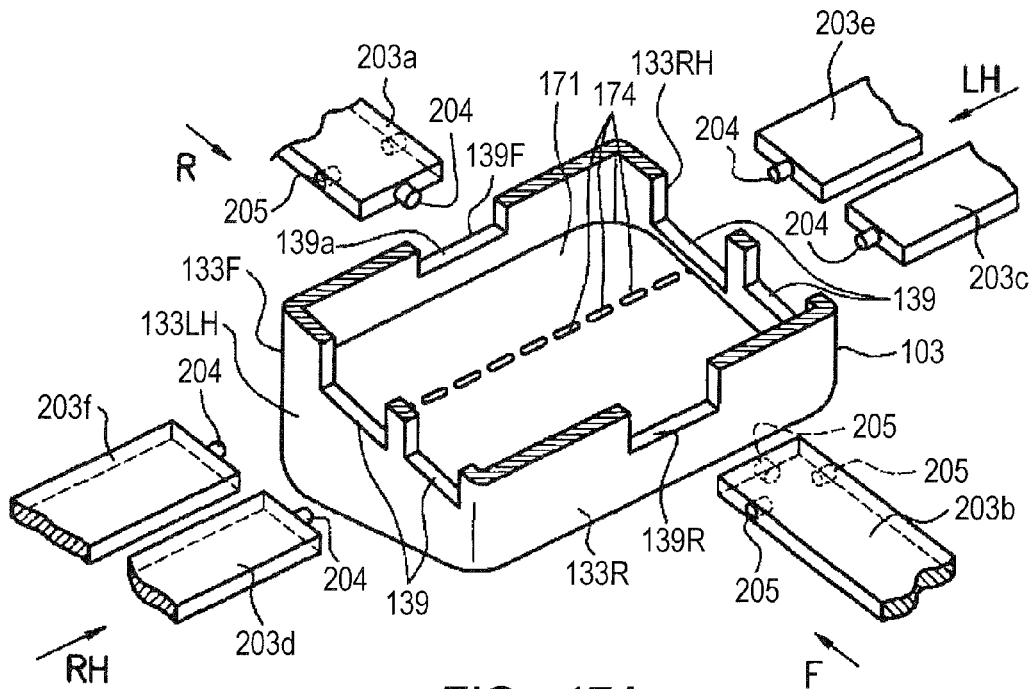
FIG. 17A is a diagram for describing an operation mode of the assembly apparatus for assembling the airbag device described above.

Support jigs 203 serving as supporting means are inserted into container main body 103 through square holes 139. Although illustration is omitted in FIG. 16A due to the description of left wall portion 133LH, as schematically illustrated in FIG. 17A, support jigs 203 are configured to enter container main body 103 from four directions. For the purpose of describing lid 105, a state where container main body 103 is cut out from flange 102 and hinge 104 is illustrated.

Figure 17B:
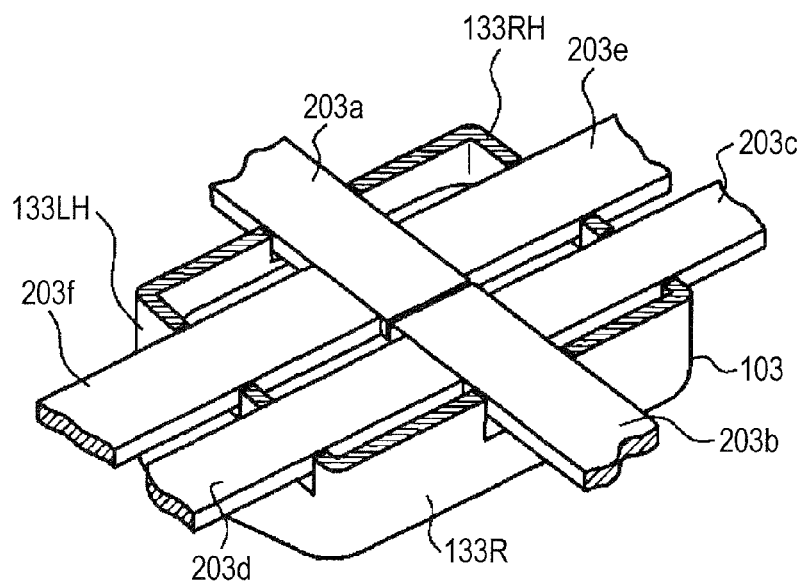
FIG. 17B is a diagram for describing an operation mode of the assembly apparatus for assembling the airbag device described above.

Support jig 203 includes six flat bar members 203a to 203f. Flat bar member 203a configured to be inserted into container main body 103 through square hole 139F of front wall portion 133F includes cylindrical boss 204 at the leading end thereof, and cylindrical holes 205 at the left and right side surfaces closer to the leading end. Flat bar member 203b configured to be inserted into container main body 103 through square hole 139R of front wall portion 133R includes cylindrical holes 205 at the leading end thereof and the left and right side surfaces closer to the leading end. Flat bar members 203c to 203f configured to be inserted into container main body 103 through square holes 139LH and 139RH of left wall portion 133LH and right wall portion 133RH all include cylindrical boss 204 at the leading ends thereof although two adjacent flat bar members are somewhat different in width. Lower edge 139a of square hole 139 and the top surface of packing main body 171 are configured to be almost flush with each other. Flat bar member 203a moves in the direction of arrow R, flat bar member 203b moves in the direction of arrow F, likewise, flat bar members 203c and 203e move in the direction of arrow LH, and flat bar members 203d and 203f move in the direction of arrow RH. Accordingly, the flat bar members are combined in a substantially two parallel and one across strapping shape as illustrated in FIG. 17B.

At this time, bosses 204 facing holes 205 are each inserted into hole 205 to form a single plate shape. Note that, a gap between two adjacent flat bar members 203c and 203e as well as a gap between 203d and 203f are a butting portion of lid portions 105a and 105b and are each considered a discontinuous portion as a welding position and do not require the continuous surface support from below. In addition, hinge 104 is configured not to overlap square holes 139F or 139R, so that flat bar members 203a and 203b do not interfere with hinge 104.

Note that, when wrapping member 172 is a slippage fabric such as a polyamide fabric, flat bar members 203a to 203f using a stainless steel or the like do not roll up or pinch wrapping member 172. Thus, even when packing main body 171 is higher than the height position of lower edge 139a of square hole 139, flat bar members 203a to 203f can slide on the packing main body 171 to proceed while pushing packing main body 171 downward.

Referring to FIG. 16A again, bonding between outer portion 190 and inner portion 101 causes melting due to friction between the components of module area 194 and lid 105 in contact with each other because lid 105 receives a push-down force of module area 194 of outer portion 190 on support jigs 203. Likewise, flange portion 102 is supported by bottom base 202 and receives a push-down force of module area 194, which causes melting due to friction between the components of module area 194 and flange portion 102 in contact with each other.

Vibration FS of top base 201 is stopped when required sufficient melting occurs at the frictional location. The abutting components are then cooled and solidified while push-down force FD is applied. Welding machine 200 can cause a push-down force and vibration using a known electric motor or pneumatic cylinder as appropriate. In this manner, packing main body 171 of airbag 170 is incorporated into container main body 103 in advance, and opening portion 134 is closed. In addition, to-be-door portion 196 in module area 194 of outer portion 190 and lid 105 are surely bonded to each other, and flange portion 102 can be bonded and attached to module area 194 at the same time.

As described above, during the bonding process, it is possible to bond lid 105 and outer portion 190 together by melting lid 105 and outer portion 190 at the abutting surfaces or by an adhesive. As to the pressure bonding, it is better to keep lid 105 and outer portion 190 in the pressure-applied state until an adequate bonding strength between lid 105 and outer portion 190 is obtained, preferably, until one or both melted materials of lid 105 and outer portion 190 are solidified, or until the adhesive is cured.

Moreover, in addition to the friction welding (vibration welding) utilizing the phenomenon that lid 105 and outer portion 109 are rubbed each other, thus generating heat, it is also possible to use hot plate welding (heat plate welding) or a method using a light beam that transmits through one of lid 105 and outer portion 190 but does not transmit through the other to melt the bonding portion. The hot plate welding mentioned above is to heat the surfaces of lid 105 and outer portion 190 to be abutted, individually by radiation heat of a heater plate, then promptly causing the surfaces to abut each other to perform pressure bonding.

In addition, a one-component room-temperature curing adhesive (RTV) or a two-component room-temperature curing adhesive, or hot-melt type adhesive may be used as an adhesive.

Figure 16B:
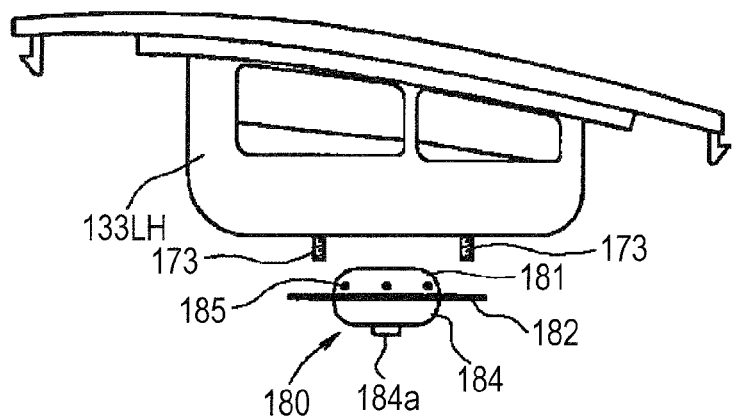
FIG. 16B is a diagram for describing an operation mode of the assembly apparatus for assembling the airbag device described above.

Finally, as illustrated in FIG. 16B, inflator 180 is attached from below, and thus, front-passenger seat airbag module 160 is completed.

Front-passenger seat airbag module 160 thus completed is brought into an instrument panel assembly line at a supplier park near the vehicle body assembly line and is fitted to an instrument panel main body via bonding claws 192 or cli 198 and incorporated. Inflator 180 is connected to a control box via a wire harness, and an instrument panel module after the attachment of other components is thus brought into a vehicle assembly line and mounted to the vehicle.

Upon activation of inflator 180 when a sensor detects a collision or the like of the vehicle, an internal squib causes a gas-forming agent around the squib to burn, and an inflation gas primarily containing an inert gas such as a nitrogen gas is injected into airbag 170 via gas port 185 to inflate airbag 170 in an extremely short time. To-be-door portion 196 for bulging out of airbag 170 opens due to tearing of tear line 195 and forms an opening for airbag 170 to bulge out. The airbag promptly inflates and deploys to serve as a cushion between the instrument panel and the front-seat passenger, thereby protecting the passenger from an impact.

In this configuration, the inflation gas supply source may be directly attached to the container portion and airbag or it is also possible to employ a configuration in which an inflation gas is supplied to the airbag via a pipe or the like by an inflation gas supply source additionally disposed apart from the container portion.

As described above, the front-seat passenger airbag module according to the present embodiment is significantly different from the airbag modules according to the related art in assembly sequence and does not require a steel made container to back up the opposite side of the bulging out direction of the airbag. Thus, a lighter and compact front-passenger seat airbag module can be provided.

(Fifth Embodiment)

A fifth embodiment of the present invention will be described with reference to FIGS. 18, 19A to 19C, and any redundant description will be omitted hereinafter.

Support jigs 213 according to the fifth embodiment has a characteristic feature that support jigs 213 are configured of pairs of flat bar members 213a and 213b and flat bar members 213c and 213d each including a notch portion 214 although flat bar members 203a and 203b are each a single flat bar. Flat bar members 213a to 213d are combined with flat bar members 203c to 203f of support jigs 203 according to the fourth embodiment.

Figure 18:
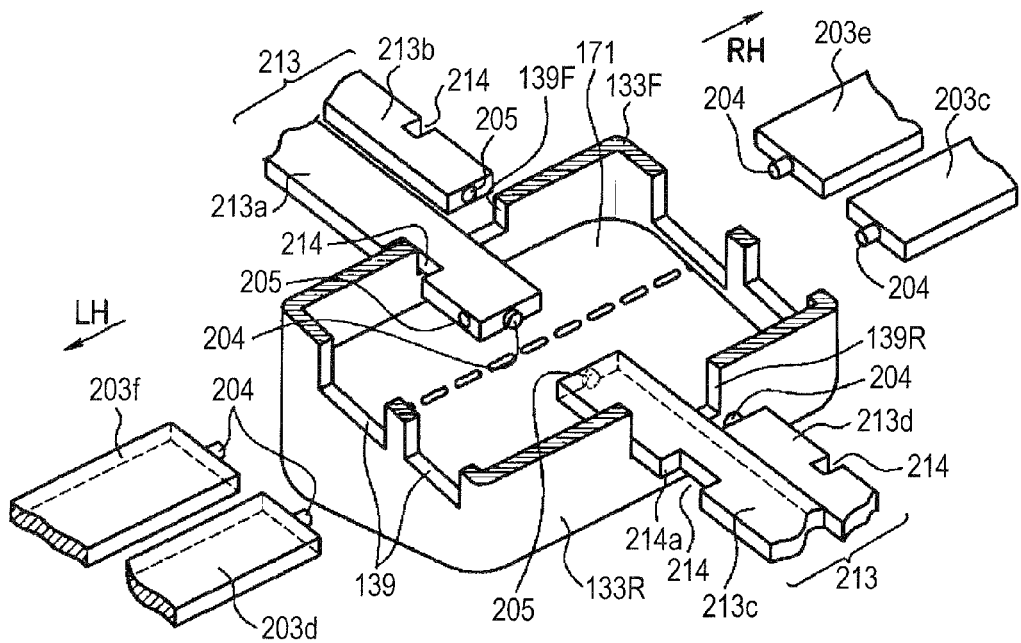
FIG. 18 is a diagram illustrating an overview of another assembly apparatus of the airbag apparatus described above.
Figures 19A, 19B, 19C:
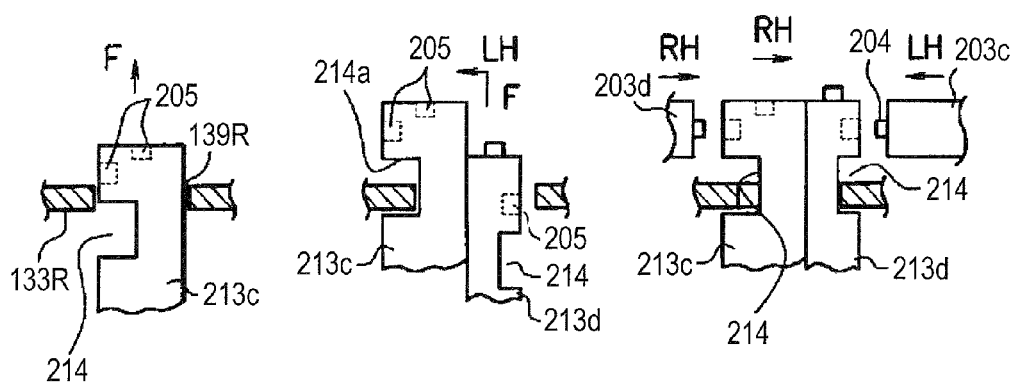
FIG. 19A is a diagram for describing an operation of another assembly apparatus for assembling the airbag device described above.
FIG. 19B is another diagram for describing the operation of the other assembly apparatus for assembling the airbag device described above.
FIG. 19C is still another diagram for describing the operation of the other assembly apparatus for assembling the airbag device described above.

In FIG. 18, the amount of flat bar member 213a that has entered container main body 103 is different from the amount of flat bar member 213c for the convenience of description, but flat bar members 213a and 213c are operated in a synchronized manner in reality. Flat bar member 213c illustrated in FIG. 18 is in process of moving in square hole 139 (139R). More specifically, flat bar member 213c moves in the direction of arrow F as illustrated in FIG. 19A. Flat bar member 213a illustrated in FIG. 18 moves laterally in the direction of arrow LH while avoiding front wall portion 133F by notch portion 214. FIG. 19B illustrates the same as in the case of flat bar member 213c, and flat bar member 213c moves in the direction of arrow F first and changes in direction and moves laterally in the direction of arrow LH. Accordingly, the area of square hole 139R occupied by the entire width of flat bar member 213c is somewhat released in square hole 139R.

Flat bar member 213d is inserted through, and as illustrated in FIG. 19C, flat bar members 213c and 213d are laterally moved together in the direction of arrow RH. Since notch portion 214 includes leading end space 214a, it is possible to sufficiently avoid hinge 104 as well.

According to support jigs 213, the same support area can be obtained even with square hole 139, which is narrower in width than that of the fourth embodiment. In the meantime, the effective length of hinge 104 can be made longer by the amount corresponding to the reduced width of square hole 139. Thus, the average plate thickness of hinge 104 can be reduced, which makes possible a more flexible door operation. Alternatively, when square hole 139 is constant, the support area can be expanded. Thus, it is possible to obtain a larger welding area in this case, which in turn, leads to an increase in welding strength.

Figure 20A:
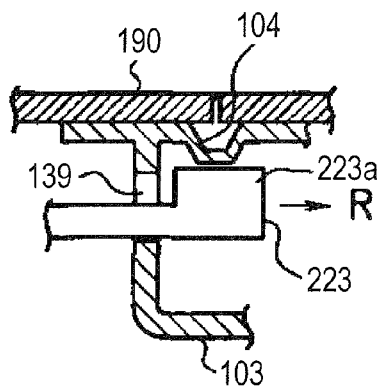
FIG. 20A is a diagram illustrating a variation of another assembly apparatus for assembling the airbag device described above.
Figure 20B:
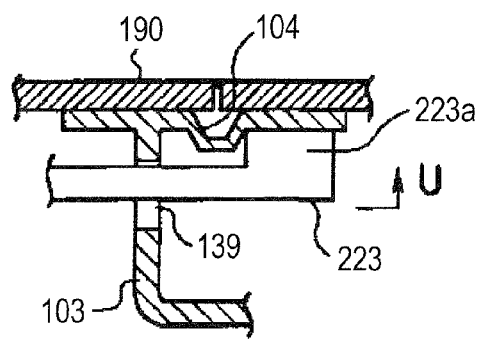
FIG. 20B is a diagram illustrating the variation of the other assembly apparatus for assembling the airbag device described above.

FIGS. 20A and 20B each illustrate a variation having a characteristic feature in that step bar member 223 including step portion 223a above is used at the position where hinge 104 is set. Step bar member 223 moves in the vertical direction (direction of arrow R in FIG. 20A) and thereafter moves in the direction of arrow U (FIG. 20B). Step bar member 223 configured as a support jig configured in this manner can form hinge 104 including the position corresponding to square hole 139 in a continuous manner.

As described above, according to the case member of the airbag device in the fourth and the fifth embodiments, the container portion includes: a main body including a bottom portion and a peripheral wall portion; a flange portion provided to the edge portion of the opening portion; and hinges each configured to connect the main body and the lid portion at the edge portion of the opening portion. In addition, the lid portions release the opening portion so as to allow the airbag to be housed from the opening portion, and integrally back up the outer portion so as to block the opening portion by being turned around the hinge. The outer portion includes: a covering portion configured to cover the opening portion on the airbag bulging side of the housing portion and to form a door portion by inflation of the airbag; a to-be-door portion divided into two parts by the to-be-torn portion configured to tear upon activation of the inflator; and an outline portion on the outer side of the to-be-door portion. Thus, an airbag device lighter in weight and easily manufacturable and capable of suppressing manufacturing costs can be provided.

Each embodiment of the present invention has been described thus far. The case member of the airbag device in the embodiments of the present invention includes: a housing portion configured to internally hold a folded airbag and an inflator and including an opening portion from which an inflated airbag protrudes; an inner portion extending from an edge portion of the opening portion of the housing portion and including a lid configured to be fixed to the housing portion at a position where the lid at least partially covers the airbag housed in the housing portion; and an outer portion configured to cover the opening portion. Thus, an airbag device lighter in weight and easily manufacturable and capable of suppressing manufacturing costs can be provided.

Moreover, the airbag device in the embodiments of the present invention includes: a case member of the airbag device; and an airbag configured to be connected to an inflation gas supply source and to be housed in an inner portion of the case member. Thus, an airbag device lighter in weight and easily manufacturable and capable of suppressing manufacturing costs can be provided.

Furthermore, the method of manufacturing an airbag device in the embodiments of the present invention includes: housing an airbag in a container portion from an opening portion and closing the opening portion by a backup portion; supporting the backup portion of the container portion from below; and placing a covering portion on the container portion and pressure bonding the covering portion from above. Thus, an airbag device lighter in weight and easily manufacturable and capable of suppressing manufacturing costs can be provided.

In addition, the method of manufacturing an airbag device in the embodiments of the present invention includes: supporting a backup portion from below in a state where an airbag is housed in a container portion main body from an opening portion; and pressure bonding a covering portion and the backup portion in a state where the covering portion is placed on the backup portion. Thus, an airbag device lighter in weight and easily manufacturable and capable of suppressing manufacturing costs can be provided.

Note that, the embodiments described above illustrate an exemplary preferred embodiment of the present invention, so that the present invention is not limited to these embodiments, and various modifications and embodiments are possible within a range not departing from the gist of the present invention.

INDUSTRIAL APPLICABILITY

The present invention is suitable for use in a case member of a front-seat passenger airbag device provided to an instrument panel, for example, an airbag device, a method of manufacturing the airbag device, and an apparatus for manufacturing the airbag device.

REFERENCE SIGNS LIST

10 Airbag device
14 Case member
15 Inflator
16 Airbag
21 Outer portion
22 Inner portion
31 Housing portion
32 Lid
37 Front side surface serving as a side surface
40 Opening portion
42, 43, 97, 98 Jig insertion hole
53 Front flange serving as a support receiving portion
54 Rear flange serving as a support receiving portion
59 Protruding portion
65 Supporting portion
66 To-be-inner-door portion
67 Hinge portion
68 Bent hinge portion
72 Insertion opening
78, 83, 107 Temporary fixing portion
89 Turnable hinge portion
J1, J2, J3, J4 Jig
101 Inner portion
102 Flange portion
103 Container main body
104 Hinge
105 lid
105a Front lid portion
105b Rear lid portion
122, 152 Rib
123 Notch
124 Tab
131 Upper edge portion
132, 140 Bottom portion
133 Peripheral wall portion
133F Front wall portion
133R Rear wall portion
134 Opening portion
135, 136, 183 Through hole
137 Steel plate
138 Slit
139 Square hole
141, 142 Inclined portion
143 Discontinuous portion
151 Outer surface
153 Base portion
154, 154a Leading end portion
155 Hook
156 Shelf receiving portion
157 Fitting hole
158 Shelf receiving recess portion
159 Side portion
160 Front-seat passenger airbag module
170 Airbag
171 Packing main body
172 Wrapping member
173 Stud bolt
174 Perforation
175 Retainer ring
180 Inflator
181 Upper portion
182 Attachment flange
184 Lower portion
185 Gas port
190 Outer portion
191 Top surface portion
192 Bonding claw
193 Undersurface portion
194 Airbag module area
195 Trench portion
196 To-be-door portion
197 Clip base
198 Clip
199 Rib
200 Welding machine
201 Top base
202 Bottom base
203 Support jig
203a, 203b, 213a to 213f Flat bar member
204 Boss
205 Hole
213 Jig
223 Step bar member
223a Step portion

The invention claimed is:
1. A case member of an airbag device, the case member being configured to house a folded airbag and an inflator configured to supply gas to inflate and deploy the airbag, the case member comprising:
an inner portion including:
a housing portion configured to internally hold the folded airbag and the inflator and provided with an opening portion from which the inflated airbag protrudes, and a lid formed integrally with an edge portion of the opening portion of the housing portion and configured to be fixed to the housing portion at a position where the lid at least partially covers the airbag housed in the housing portion; and an outer portion configured to cover the opening portion, wherein the inner portion includes a temporary fixing portion configured to temporarily fix the lid to the housing portion while the lid is bent toward the opening portion of the housing portion.

2. The case member of the airbag device according to claim 1, wherein:

the lid extends from the edge portion of the opening portion of the housing portion and is bent toward the opening portion and fixed to the housing portion at a position where the lid at least partially covers the airbag housed in the housing portion; and the outer portion is fixedly attached to the inner portion while covering at least the position of the lid.

3. The case member of the airbag device according to claim 2, wherein:

the housing portion includes a support receiving portion that extends to the edge portion of the opening portion; and the lid includes:
a bent hinge portion that extends to the support receiving portion and that is deformable,
a supporting portion configured to be connected to the support receiving portion via the bent hinge portion and to be at least partially placed over the support receiving portion by the bending of the lid toward the opening portion of the housing portion by the bent hinge portion,
a to-be-inner-door portion configured to cover the opening portion and to spread under a deployment pressure generated when the airbag is inflated, and
a hinge portion configured to connect the to-be-inner-door portion and the supporting portion in a deformable manner and to be positioned within the housing portion by the bending of the lid toward the opening portion of the housing portion at the bent hinge portion.

4. The case member of the airbag device according to claim 3, wherein:

the supporting portion includes an insertion opening; and
the support receiving portion includes a protruding portion configured to become substantially flush with the supporting portion when inserted into the insertion opening by the bending of the lid toward the opening portion of the housing portion at the bent hinge portion.

5. The case member of the airbag device according to claim 3, wherein:

the housing portion includes a side surface portion inclined at an acute angle with respect to the lid; and
the inner portion includes a turnable hinge portion configured to connect a portion of the inner portion that includes the lid and the side surface portion and a portion of the inner portion that does not include the side surface portion together in a turnable manner.

6. The case member of the airbag device according to claim 3, wherein:

the outer portion is fixed to the inner portion by vibration welding; and the inner portion includes a jig insertion hole into which a jig that supports the to-be-inner-door portion is inserted when the outer portion is welded by vibration.

7. The case member of the airbag device according to claim 2, wherein:

the lid includes:
a hinge portion that extends to the edge portion of the opening portion of the housing portion and that is deformable and is configured to be positioned within the housing portion by the bending of the lid toward the opening portion of the housing portion at the edge portion of the opening portion, and
a to-be-inner-door portion connected to the housing portion via the hinge portion and configured to cover the opening portion by the bending of the lid toward the opening portion of the housing portion at the edge portion of the opening portion and to spread under a deployment pressure when the airbag is inflated.

8. The case member of the airbag device according to claim 1, wherein the housing portion includes:
a main body having a bottom portion and a peripheral wall portion,
a flange portion provided to an edge portion of the opening portion, and
a hinge formed integrally with the main body and configured to connect the main body and the lid at the edge portion of the opening portion,
the lid is formed integrally with the main body via the hinge, opens the opening portion to allow the airbag to be housed from the opening portion, and integrally backs up the outer portion so as to block the opening portion by being turned around the hinge; and
the outer portion includes:
a to-be-door portion divided into portions by a to-be-torn portion that tears upon activation of the inflator and configured to cover the opening portion on an airbag bulging side of the housing portion and to form a door portion by inflation of the airbag, and
an outline portion on an outer side of the to-be-door portion.

9. An airbag device comprising:
the case member of the airbag device according to claim 1; and
an airbag configured to be connected to an inflator and to be housed in an inner portion of the case member.

10. A method of manufacturing the airbag device according to claim 9, the method comprising:
housing the airbag in the housing portion from the opening portion and closing the opening portion using the lid;
supporting the lid of the housing portion from below; and
placing the outer portion on the housing portion and pressure bonding the outer portion onto the housing portion from above.

11. An apparatus for manufacturing the airbag device according to claim 9, the apparatus comprising:
a supporting unit configured to support the lid from below while the airbag is housed in the housing portion from the opening portion; and
a bonding unit configured to pressure bond the outer portion and the lid together while the outer portion is placed on the lid.

* * * * *